(12) United States Patent
Braun et al.

(10) Patent No.: US 8,067,508 B2
(45) Date of Patent: Nov. 29, 2011

(54) COMPOSITIONS CONSISTING OF PARTIALLY SILYL-TERMINATED POLYMERS

(75) Inventors: Daniela Braun, Shanghai (CN); Johann Klein, Düsseldorf (DE); Thomas Bachon, Düsseldorf (DE); Andreas Bolte, Düsseldorf (DE); Christiane Kunze, Köln (DE)

(73) Assignee: Henkel AG & Co. KGaA, Duesseldorf (DE)

(*) Notice: Subject to any disclaimer, the term of this patent is extended or adjusted under 35 U.S.C. 154(b) by 307 days.

(21) Appl. No.: 12/416,404

(22) Filed: Apr. 1, 2009

(65) Prior Publication Data

US 2010/0081757 A1    Apr. 1, 2010

Related U.S. Application Data

(63) Continuation of application No. PCT/EP2007/060657, filed on Oct. 7, 2007.

(30) Foreign Application Priority Data

Oct. 9, 2006  (DE) .......................... 10 2006 048 041

(51) Int. Cl.
    *C08L 83/06*    (2006.01)
(52) U.S. Cl. ........................ 525/477; 524/537
(58) Field of Classification Search .................. 525/477; 524/537
    See application file for complete search history.

(56) References Cited

U.S. PATENT DOCUMENTS

| 3,278,457 | A | 10/1966 | Milgrom |
| 3,971,751 | A | 7/1976 | Isayama et al. |
| 4,857,623 | A | 8/1989 | Emmerling et al. |
| 5,364,955 | A | 11/1994 | Zwiener et al. |
| 5,554,709 | A | 9/1996 | Emmerling et al. |
| 5,703,146 | A * | 12/1997 | Iwakiri et al. ................. 523/200 |
| 7,115,696 | B2 * | 10/2006 | Roesler et al. .................. 528/28 |
| 7,473,441 | B2 * | 1/2009 | Iwakirii et al. ................ 427/387 |
| 2004/0127671 | A1 | 7/2004 | Roesler et al. |

FOREIGN PATENT DOCUMENTS

| DE | 19727029 A1 | 1/1999 |
| DE | 102005041954 A1 | 3/2007 |
| EP | 0170865 A1 | 2/1986 |
| EP | 0397036 A2 | 11/1990 |
| EP | 0327017 B1 | 1/1995 |
| EP | 0333222 B1 | 12/1995 |
| JP | 2006063335 A * | 3/2006 |
| WO | 9948942 A1 | 9/1999 |
| WO | 0206367 A1 | 1/2002 |
| WO | 2005042601 A1 | 5/2005 |
| WO | 2005042605 A1 | 5/2005 |
| WO | 2005042607 A1 | 5/2005 |
| WO | 2005042609 A1 | 5/2005 |
| WO | 2005047394 A1 | 5/2005 |
| WO | 2006034411 A2 | 3/2006 |

OTHER PUBLICATIONS

JP 2006063335 A, Mar. 2006, Machine Translation.*

* cited by examiner

*Primary Examiner* — Satya Sastri
(74) *Attorney, Agent, or Firm* — James E. Piotrowski; Steven C. Bauman

(57) ABSTRACT

This disclosure relates to a curable composition comprising at least one polymer A with at least one reactive silyl group and at least one polymer B with at least one reactive silyl group, the number of reactive silyl groups in the polymer A being greater or equal to the number of silyl groups in polymer B and the reactive silyl groups being capable of cross-linking to form siloxane bonds. The disclosure also relates to preparations containing a composition of this type and to the use of said compositions.

15 Claims, No Drawings

COMPOSITIONS CONSISTING OF PARTIALLY SILYL-TERMINATED POLYMERS

CROSS REFERENCE TO RELATED APPLICATIONS

This application is a continuation of International Application No. PCT/EP2007/060657, filed Oct. 7, 2007, which claims the benefit of German Application No. DE 10 2006 048 041.4, filed Oct. 9, 2006, the contents of each of which are incorporated by reference in their entirety.

FIELD

The present invention relates to a curable composition, comprising at least one polymer A having at last one reactive silyl group and at least one polymer B having at least one reactive silyl group, such that the number of reactive silyl groups in polymer A is greater than or equal to the number of silyl groups in polymer B and the reactive silyl groups can crosslink to form siloxane bonds. In addition, the invention relates to preparations containing such a composition and the use of such compositions and preparations containing such compositions.

BACKGROUND

Silane-crosslinking adhesive and sealing compounds contain as binders alkoxysilane-terminated or acyloxysilane-terminated polymers. Polymer systems having reactive alkoxysilyl groups have long been known. In the presence of atmospheric humidity, these alkoxysilane-terminated polymers are capable of condensing with one another, splitting off the alkoxy groups, even at room temperature. Depending on the alkoxysilane group content and their structure, mainly long-chain polymer (thermoplastics), relatively wide-mesh three-dimensional networks (elastomers) and highly crosslinked systems (thermosetting plastics) are formed.

As a rule, the polymers have an organic basic structure, which has the alkoxysilane groups. The basic organic structure may be, for example, polyurethanes, polyesters, polyesters, polyols, poly(meth)acrylates, polyvinyl alcohols, etc.

DE 197 27 029 A1 discloses a single-component reactive system composition containing an alkoxysilane-terminated polyurethane, a curing catalyst and conventional additives, if necessary.

WO 99/48942 A1 describes alkoxysilane-terminated polyurethanes and corresponding preparations that contain polyurethane and may also contain solvents, catalysts, plasticizers, reactive diluents, fillers and the like, in addition to the alkoxysilated polyurethanes.

EP 333222 B1 claims a curable polymer composition comprising a silylated polymer based on alkyl (meth)acrylate, a silylated polymer based on oxyalkylene, a silicon-containing compound and a curing accelerator.

U.S. Pat. No. 3,971,751 discloses silyl-terminated polymers containing essentially polyoxyalkylene units in the backbone for use in the field of sealing and adhesive compounds.

U.S. Pat. No. 3,278,457 discloses the synthesis of high-molecular polyoxyalkylene polymers with a high molecular weight distribution by so-called double metal cyanide catalysis.

EP 0397036 describes the introduction of reactive silyl groups capable of crosslinking onto such polyoxyalkylene polymers, e.g. by the hydrosilylation method.

U.S. Pat. No. 5,364,955 describes, as another method of attaching reactive silyl groups capable of crosslinking to such polyoxyalkylene polymers, the reaction of isocyanate-terminated polymers consisting of a polyoxyalkylene basic structure with aminosilanes.

EP 1678254 A1 describes the reaction of a hydroxyl-terminated polyoxyalkylene polymer (polyether polyols) with isocyanatosilanes to attach reactive silyl groups to polyoxyalkylene basic structures.

EP 1678254 A1 discloses polymeric compositions of mixed oxyalkylene units including both mixtures of polymers constructed from various oxyalkylene units and polymers constructed from different oxyalkylene units.

EP 327017 B1 claims a curing composition comprising a silylated oxyalkylene polymer, a polymeric plasticizer having an average (number average) molar weight of 500 to 15,000 g/mol and liquid polybutadiene.

WO 2005/042605 discloses moisture-curing polyether urethanes, which have an alkoxysilane functional finish. The reactive silyl groups are attached to the polyoxyalkylene polymer, which will later have at least two reactive silyl groups, by reaction of the polyoxyalkylene polymers which contains groups reactive with isocyanate groups, with silanes containing isocyanate. This silyl group is attached to the polyoxyalkylene polymer, which later has one reactive silyl group, by reaction of an aminosilane with an isocyanate group. This method results in the composition containing polymers having urea groups. However, urea groups can have a negative effect on the viscoelastic and/or plastic properties of the cured compositions as well as the processability of the curable compositions.

With all moisture-curing polyurethanes or preparations (systems) containing such polyurethanes, in particular, however, with the systems containing silicon, it is usually a disadvantage that these systems become brittle after processing due to the curing operation and thereby lose a large portion of their elasticity and/or have lower tear propagation strength values. The loss of elasticity occurs frequently at low temperatures in particular; on cooling, the known systems often lose their resilience and flexibility. However, attempts to improve the elasticity and flexibility of the cured systems often lead to an exacerbation of other material properties, e.g. a higher tackiness of the surface, or the systems have such a high viscosity before processing that solvents must be used, e.g. to ensure processability. Likewise, a reduction in stability of these systems is often observed during storage. Exacerbation of important material properties or storage properties and also the use of solvents are not acceptable, either economically or ecologically.

The use of plasticizers in such a system often cannot significantly improve the viscoelastic properties.

For example, for use in sealing compounds and highly elastic adhesives, low-molecular plasticizers, e.g. phthalates must be incorporated into the compositions to achieve the required elasticity. Not only are these plasticizers often objectionable toxicologically but also adding low-molecular compounds usually results in exacerbation of viscoelastic properties of the preparations, e.g. an increased viscosity of the curable composition. Furthermore, addition of low-molecular plasticizers has also a negative effect on the restoring force of the cured compositions, i.e., the cured compounds have inadequate restoring force.

High-molecular plasticizers in some cases also have an extremely negative effect on the processability of the uncured compositions. In addition, the use of high-molecular plasticizers can have an unfavorable influence on the elastic properties and the restoring force of the cured composition.

SUMMARY

One object of the present invention was therefore to make available a composition which would not have the aforementioned disadvantages when used with reactive end groups.

In particular, the object of the present invention was to make available a composition which is crosslinkable, i.e., curable, via one or more alkoxysilane groups and nevertheless has improved viscoelastic and mechanical properties and has excellent elasticity, flexibility and tear propagation strength even at low temperatures. In addition, the object of the present invention was to make available a preparation and/or adhesive compound, sealing compound or coating compound, which contains the inventive composition and whose viscosity determines a good processability and/or ensures good material properties of the crosslinked and/or cured product despite a low viscosity, in particular ensuring a good stability in UV or water load on glass surfaces.

In particular, the object of the present invention was to provide adhesive, sealing or coating compounds, which are characterized by an especially low modulus of elasticity in the cured state with at the same time a high recovery ability after removal of the tensile stress.

It has surprisingly been found that a curable composition comprising at least one polymer A and at least one polymer B, each of which has at least one reactive silyl group, such that the number of reactive silyl groups in polymer A is greater than or equal to the number of silyl groups in polymer B, and the reactive silyl groups can crosslink to form siloxane bonds, do not have the disadvantages mentioned above for the state of the art.

It has been found that the inventive compositions have low elastic moduli and thus have a high elasticity with very good extensibility values. In addition it has been found that the inventive compositions at the same time have a very good resilience despite the low modulus of elasticity.

In addition, it has been found that by varying the type and amount of non-reactive groups on polymer B in the composition, the elasticity behavior can be adjusted over a wide range.

Furthermore, the curing time can be accelerated, e.g. by increasing the amount of isocyanate-containing silane compound which introduces the reactive silyl group onto the organic basic structure.

DETAILED DESCRIPTION

Therefore, the subject matter of the present invention is a curable composition, comprising (i) at least one polymer A having at least one reactive silyl group and (ii) at least one polymer B having at least one reactive silyl group, such that the number of reactive silyl groups in (i) is greater than or equal to the number of silyl groups in (ii), and the reactive silyl groups can crosslink to form siloxane bonds.

Polymer A here with at least one reactive silyl group is preferably different from polymer B with at least one reactive silyl group; in particular the number of reactive silyl groups in polymer A is preferably greater than the number of reactive silyl groups in polymer B.

Polymer A in the inventive curable composition is preferably a compound of general formula (I)

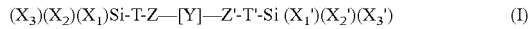  (I)

in which $X_1$, $X_2$, $X_3$, $X_1'$, $X_2'$, $X_3'$ independently of one another denote a halogen atom, an amino group, a mercapto group or an alkenyloxy group, an alkyl residue with 1 to 40 carbon atoms or an $OR^1$ residue, where $R^1$ is an alkyl residue with 1 to 40 carbon atoms or an acyl residue with 1 to 40 carbon atoms, T and T' independently of one another are a linear or branched, substituted or unsubstituted alkylene residues with 1 to 20 carbon atoms, Z, Z' independently of one another are a carbamate, carboxy, carbonate or sulfonate group or an oxygen atom, [Y] is an organic basic structure.

$X_1$, $X_2$, $X_3$, $X_1'$, $X_2'$, $X_3'$ here are preferably alkyl residues with 1 to 40 carbon atoms, in particular 1 to 4 carbon atoms, preferably methyl, ethyl, propyl, butyl or an $OR^1$ residue, where $R^1$ is in particular an alkyl residue with preferably 1 to 4 carbon atoms, preferably methyl, ethyl, propyl, butyl or an acyl residue with preferably 1 to 4 carbon atoms.

T and T' independently of one another are preferably linear or branched, substituted or unsubstituted alkylene residues with 1 to 8 carbon atoms, in particular a methylene, ethylene, propylene or butylene residue. T and T' may be the same as (T=T') or different from (T≠T') one another.

The polymer A contains at least one reactive silyl group. This means that at least one of the residues $X_1$, $X_2$, $X_3$, $X_1'$, $X_2'$ or $X_3'$ in general formula (I) represents a hydrolyzable residue. This is especially preferably an alkoxy group, i.e., an $OR^1$ residue, where $R^1$ is an alkyl residue with 1 to 40 carbon atoms, in particular 1 to 4 carbon atoms.

Polymer B in the inventive curable composition is preferably a compound of general formula (II)

  (II)

where $X_1$, $X_2$, $X_3$ independently of one another may denote a halogen atom, an amino group, a mercapto group or an alkenyloxy group, an alkyl residue with 1 to 40 carbon atoms or an $OR^1$ residue, where $R^1$ is an alkyl residue with 1 to 40 carbon atoms or an acyl residue with 1 to 40 carbon atoms, T is a linear or branched, substituted or unsubstituted alkylene residue with 1 to 20 carbon atoms, Z is a carbamate, carboxy, carbonate or sulfonate group or an oxygen atom,

[Y] is an organic basic structure,

G is a carbamate, carboxy, carbonate or sulfonate group or an oxygen atom or a group -E-D-E'-, where E is a carbamate, carboxy, carbonate or sulfonate group or an oxygen atom, E' is a carbamate, carboxy, carbonate, sulfonate or urea group or an oxygen atom, D is a linear or branched, substituted or unsubstituted alkylene, acylene or arylene residue with 1 to 40 carbon atoms preferably methylene, ethylene, propylene or butylene, $R^2$ is a linear or branched, substituted or substituted saturated or unsaturated alkyl, acyl or aryl residue with 1 to 40 carbon atoms or a silyl group, which is not capable of forming siloxane bonds.

The $(X_3)(X_2)(X_1)Si$ unit and/or $(X_1')(X_2')(X_3')Si$ unit in formula (I) and/or (II) here represent reactive silyl groups, which are explained in greater detail below under the term "silicon structural element" of general formula (IIIa) and/or (IIIb).

$X_1$, $X_2$, $X_3$ in formula (II) preferably denote alkyl residues with 1 to 40 carbon atoms, in particular 1 to 4 carbon atoms, preferably methyl, ethyl, propyl, butyl or an $OR^1$ residue, where $R^1$ is in particular an alkyl residue with preferably 1 to 4 carbon atoms, preferably methyl, ethyl, propyl, butyl or an acyl residue with preferably 1 to 4 carbon atoms.

There is preferably a linear or branched, substituted or unsubstituted alkylene residue with 1 to 8 carbon atoms, in particular ethylene, propylene or butylene.

Preferred alkylene residues $R^2$ include in particular substituted or unsubstituted —$CH_3$ (methyl), —$CH_2$—$CH_3$ (ethyl), —$CH_2$—$CH_2$—$CH_3$ (propyl), —$CH_2$—$CH_2$—$CH_2$—$CH_3$ (butyl), —$CH_2$—$CH_2$—$CH_2$—$CH_2$—$CH_3$ (hexyl), —$CH_2$—$CH_2$—$CH_2$—$CH_2$—$CH_2$—$CH_3$ (heptyl), —$CH_2$—$CH_2$—$CH_2$—$CH_2$—$CH_2$—$CH_2$—$CH_2$—$CH_3$ (octyl) as well as the branched derivatives thereof, such as isopropyl and tert-butyl.

Polymer B contains at least one reactive silyl group. This means that at least one of the residues $X_1$, $X_2$ or $X_3$ in general formula (II) denotes a hydrolyzable residue. This is especially preferably an alkoxy group, i.e., an $OR^1$ residue, where $R^1$ is an alkyl residue with 1 to 40 carbon atoms, in particular 1 to 4 carbon atoms.

The properties of the curable compositions can be influenced definitively by the choice of suitable organic basic structure (Y).

Suitable organic basic structures (Y) preferably include polymeric compounds such as alkyd resins, oil-modified alkyd resins, unsaturated polyesters, natural oils, e.g. linseed oil, tung oil, soybean oil and epoxides, polyamides, thermoplastic polyesters, e.g. polyethylene terephthalate and polybutylene terephthalate, polycarbonates, polyalkylenes, e.g. polyethylenes and polybutylenes, polystyrenes, polypropylenes, ethylene-propylene copolymers and terpolymers, acrylates, e.g. homopolymers and copolymers of acrylic acid, acrylates, methacrylates, acrylamides, their salts and the like, phenolic resins, polyoxymethylene homopolymers and copolymers, polyurethanes, polysulfones, polyoxyalkylene, polysulfide rubbers, nitrocellulose, vinyl butyrate, vinyl polymers, e.g. vinyl chloride-containing polymers and/or vinyl acetate-containing polymers, ethylcellulose, cellulose acetates and butyrates, rayon, shellac, waxes, ethylene copolymers, e.g. ethylene-vinyl acetate copolymers, ethylene-acrylic acid copolymers, ethylene-acrylate copolymers, organic rubbers, silicone resins and the like. Other examples include polyethers such as polyethylene oxide, polypropylene oxide, propylene glycol and polytetrahydrofuran, polyol, poly(meth)acrylate, polyvinyl alcohol. Preferred organic basic structures include polyethers, polyesters, polyurethanes and polyols, in particular polyethers, e.g. polypropylene glycol is preferred. In an especially preferred form, the organic basic structure is a polyoxyalkylene polymer synthesized by ring-opening polymerization of an oxyalkylene compound by double metal cyanide catalysis.

The organic basic structure (Y) may also be copolymers of the polymers listed above. Preferred polyoxyalkylene polymers include polyoxyethylene, polyoxypropylene, polyoxybutylene, polyoxyhexylene, polyoxytetramethylene or copolymers thereof. For example, the viscoelastic properties of the curable compositions can be controlled to a certain extent through the choice of suitable oxyalkylene units. Therefore, the use of polymers which contain essentially polyoxyalkylene units in the organic basic structure has proven to be especially advantageous for use in sealing compounds and for adhesives in which a relatively low modulus of elasticity is desired.

A reactive silyl group in the sense of the present invention is a silicon structural element of the general formula (IIIa) and/or (IIIb)

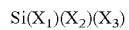 (IIIa)

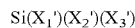 (IIIb)

in which at least one of the residues $X_1$, $X_2$, $X_3$, $X_1'$, $X_2'$ or $X_3'$ is a hydrolyzable residue and $X_1$, $X_2$, $X_3$, $X_1'$, $X_2'$ or $X_3'$ independently of one another may be a halogen atom, a hydrogen atom, an acyloxy, amino, mercapto or alkyleneoxy group or an alkyl residue with 1 to 40 carbon atoms or an alkoxy and/or acyloxy residue $OR^1$, where $R^1$ is an alkyl residue with 1 to 40 carbon atoms, preferably 1 to 4 carbon atoms or an acyl residue with 1 to 40 carbon atoms.

The hydrolyzable residues $X_1$, $X_2$, $X_3$, $X_1'$, $X_2'$ and $X_3'$ of the reactive silyl group (IIIa and/or b) in general enter into a hydrolysis reaction in which silanol groups are created by reaction with water (humidity), for example, (reaction: —$SiX+H_2O \rightarrow SiOH+HX$) and the silanol groups thereby created then condense, creating siloxane bonds (condensation reaction).

$X_1$, $X_2$, $X_3$, $X_1'$, $X_2'$ and $X_3'$ in formula (IIIa and/or b) preferably are an alkoxy group and/or alkyl group. In particular $X_1$, $X_2$ and $X_3$ and/or $X_1'$, $X_2'$ and $X_3'$ are a combination of methoxy and ethoxy and/or methyl, ethyl, propyl, isopropyl, n-butyl or isobutyl, especially preferably methoxy or ethoxy and/or methyl or ethyl. Examples include trimethoxy-, triethoxy-, dimethoxymethyl-, dimethoxyethyl-, dimethoxypropyl-, dimethoxybutyl-, diethoxymethyl-, diethoxyethyl-, diethoxypropyl-, diethoxybutyl-, methoxydimethyl-, methoxydiethyl-, methoxydipropyl-, methoxydibutyl-, ethoxydimethyl-, ethoxydiethyl-, ethoxy-dipropyl- and ethoxydibutyl-silyl groups.

Alkoxydialkylsilyl groups are preferred, i.e., silyl groups of the formula (IIIa) and/or (IIIb), where $X_1 = OR^1$ and/or $X_1' = OR^1$. Most especially preferably, the reactive silyl group (IIIa and/or b) has two or three alkoxy groups, with two methoxy groups and one alkyl group or three methoxy groups being preferred, i.e., these are dialkyloxyalkylsilyl groups with $X_1 = OR^1$ and $X_2 = OR^1$ and/or $X_1' = OR^1$ and $X_2' = OR^1$ or trialkoxysilyl groups with $X_1 = OR^1$, $X_2 = OR^1$ and $X_3 = OR^1$ and/or $X_1' = OR^1$, $X_2' = OR^1$ and $X_3' = OR^1$, where $OR^1$ is preferably a methoxy group in each case.

A "carbamate group" is understood within the scope of the present invention to be a structural element of the general formula (IV)

 (IV)

where the bond of the carbonate group in polymer A and B may be accomplished via the nitrogen group as well as the oxygen at T and/or T', but the linkage of the nitrogen to T and/or T' is preferred.

A "carboxy group" is understood within the scope of the present invention to be an atomic group COO, where here again, the bond to T and/or T' may also be via the carbon atom or the oxygen atom.

An "acyl and/or acylene residue" is understood within the scope of the present invention to be an atomic group formed formally from acids by splitting an OH group, e.g. from carboxylic acid residues —CO— or sulfonic acid —$SO_2$—. An acyl and/or acylene residue is preferably selected from —CO—, —NH—CO— (acylamino) or —O—CO— (acyloxy), —CO—$NR_2$— (carbamoyl), $P(O)R_2$ (phosphinoyl).

"Alkylene residues" within the scope of the present invention are understood to be divalent alkyl residues, i.e., residues which may enter into a bond at both ends. Preferred alkylene residues include, for example, substituted or unsubstituted, saturated or unsaturated alkyl residues having 1 to 40 carbon atoms. Preferred compounds are selected, for example, from —CH₂— (methylene), —CH₂—CH₂— (ethylene), —CH₂—CH₂—CH₂— (propylene), —CH₂—CH₂—CH₂—CH₂— (butylene), —CH₂—CH₂—CH₂—CH₂—CH₂— (hexylene), —CH₂—CH₂—CH₂—CH₂—CH₂—CH₂— (heptylene), —CH₂—CH₂—CH₂—CH₂—CH₂—CH₂—CH₂—CH₂ (octylene) but also the branched derivatives thereof such a isopropylene, tert-butylene.

A "silyl group not capable of forming siloxane bonds" within the scope of the present invention is understood to refer to compounds that have silyl groups but are not reactive, so they do not contribute toward crosslinking of the curable composition. Such silyl groups may be represented by a structural element of the general formula (V):

where R³ independently of one another denotes a substituted or unsubstituted, cyclic or non-cyclic, saturated or unsaturated alkyl residue having 1 to 20 carbon atoms or a substituted aromatic.

R³ is preferably an alkyl residue having 1 to 8 carbon atoms, in particular substituted or unsubstituted alkyl residues, e.g. —CH₃ (methyl), —CH₂—CH₃ (ethyl), —CH₂—CH₂—CH₃ (propyl), —CH₂—CH₂—CH₂—CH₃ (butyl), —CH₂—CH₂—CH₂—CH₂—CH₃ (hexyl), —CH₂—CH₂—CH₂—CH₂—CH₂—CH₃ (heptyl), —CH₂—CH₂—CH₂—CH₂—CH₂—CH₃ (octyl) as well as the branched derivatives thereof such as isopropyl, tert-butyl.

A "urea group" (E') is understood within the scope of the present invention to be a structural element of the general formula (VI)

in which the bonding of the urea group may also be accomplished via the nitrogen atom having R⁴ as well as via the nitrogen atom having the hydrogen atom.

The residue R⁴ may denote any conceivable residues, but preferably a hydrogen atom or a substituted or unsubstituted, cyclic or non-cyclic, saturated or unsaturated alkyl residue having 1 to 20 carbon atoms, in particular substituted or unsubstituted alkyl residues, e.g. —CH₃ (methyl), —CH₂—CH₃ (ethyl), —CH₂—CH₂—CH₃ (propyl), —CH₂—CH₂—CH₂—CH₃ (butyl), —CH₂—CH₂—CH₂—CH₂—CH₃ (hexyl), —CH₂—CH₂—CH₂—CH₂—CH₂—CH₃ (heptyl), —CH₂—CH₂—CH₂—CH₂—CH₂—CH₂—CH₂—CH₃ (octyl) as well as the branched derivatives thereof, e.g. isopropyl, tert-butyl, a substituted or unsubstituted alkenyl residue with 1 to 20 carbon atoms, preferably methylene, ethylene, propylene, butylene, substituted or unsubstituted aromatic with 6 carbon atoms to 10 carbon atoms, where two condensed aromatics are also possible, ether compounds or ester compounds.

According to another preferred embodiment, polymer A and polymer B are present in the inventive curable composition in a ratio of 1:0.01 to 1:5 by weight of composition.

Another subject matter of the present invention is a curable composition obtainable by reaction of at least one isocyanate-reactive compound with at least one first isocyanate-containing silane compound and with at least one second isocyanate-containing compound, whereby the reaction product includes at least two polymeric compounds, polymer A and polymer B, each having at least one reactive silyl group.

Polymer A here is preferably different from polymer B; in particular the number of reactive silyl group in polymer A is preferably greater than the number of reactive silyl groups in polymer B.

Polymer A in the inventive curable composition is preferably a compound of the general formula (I)

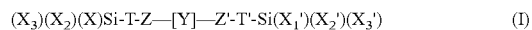

where $X_1, X_2, X_3, X_1', X_2', X_3'$ independently of one another may denote a halogen atom, an amino group, a mercapto group or an alkenyloxy group, an alkyl residue with 1 to 40 carbon atoms or an $OR^1$ residue, where $R^1$ is an alkyl residue with 1 to 40 carbon atoms or an acyl residue with 1 to 40 carbon atoms, T and T' independently of one another are a linear or branched, substituted or unsubstituted alkylene residues with 1 to 20 carbon atoms, Z, Z' are a carbamate group,

[Y] is an organic basic structure.

$X_1, X_2, X_3, X_1', X_2', X_3'$ here are preferably alkyl residues with 1 to 40 carbon atoms, in particular 1 to 4 carbon atoms, preferably methyl, ethyl, propyl, butyl or an $OR^1$ residue, where $R^1$ is in particular an alkyl residue with preferably 1 to 4 carbon atoms, preferably methyl, ethyl, propyl, butyl or an acyl residue with preferably 1 to 4 carbon atoms.

T and T' independently of one another are preferably linear or branched, substituted or unsubstituted alkylene residues with 1 to 8 carbon atoms, in particular a methylene, ethylene, propylene or butylene residue. T and T' may be the same as (T=T') or different from (T≠T') one another.

The polymer A contains at least one reactive silyl group. This means that at least one of the residues $X_1, X_2, X_3, X_1', X_2'$ or $X_3'$ in general formula (I) represents a hydrolyzable residue. This is especially preferably an alkoxy group, i.e., an $OR^1$ residue, where $R^1$ is an alkyl residue with 1 to 40 carbon atoms, in particular 1 to 4 carbon atoms.

Polymer B in the inventive curable composition is preferably a compound of general formula (II)

where $X_1, X_2, X_3$ independently of one another may denote a halogen atom, an amino group, a mercapto group or an alkenyloxy group, an alkyl residue with 1 to 40 carbon atoms or an $OR^1$ residue, where $R^1$ is an alkyl residue with 1 to 40 carbon atoms or an acyl residue with 1 to 40 carbon atoms, T is a linear or branched, substituted or unsubstituted alkylene residue with 1 to 20 carbon atoms, Z is a carbamate group,

[Y] is an organic basic structure,

G is a carbamate group or a group -E-D-E'-,

E is a carbamate, carboxy, carbonate or sulfonate group or an oxygen atom,

E' is a carbamate, carboxy, carbonate, sulfonate or urea group or an oxygen atom, D is a linear or branched, substituted or unsubstituted alkylene, acylene or arylene residue with 1 to 40 carbon atoms preferably methylene, ethylene, propylene or butylene, $R^2$ is a linear or branched, substituted or substituted alkyl, acyl or aryl residue with 1 to 40 carbon atoms or a silyl group, which is not capable of forming siloxane bonds.

$X_1, X_2, X_3$ preferably denote alkyl residues with 1 to 40 carbon atoms or an $OR^1$ residue, where $R^1$ is in particular an alkyl residue with preferably 1 to 4 carbon atoms, or an acylene residue with preferably 1 to 4 carbon atoms.

There is preferably a linear or branched, substituted or unsubstituted alkylene residue with 1 to 8 carbon atoms, in particular ethylene, propylene or butylene.

Preferred alkylene residues $R^2$ are in particular substituted or unsubstituted —$CH_3$ (methyl), —$CH_2$—$CH_3$ (ethyl), —$CH_2$—$CH_2$—$CH_3$ (propyl), —$CH_2$—$CH_2$—$CH_2$—$CH_3$ (butyl), —$CH_2$—$CH_2$—$CH_2$—$CH_2$—$CH_3$ (hexyl), —$CH_2$—$CH_2$—$CH_2$—$CH_2$—$CH_2$—$CH_3$ (heptyl), —$CH_2$—$CH_2$—$CH_2$—$CH_2$—$CH_2$—$CH_2$—$CH_2$—$CH_3$ (octyl) as well as the branched derivatives thereof, such as isopropyl and tert-butyl.

Polymer B contains at least one reactive silyl group. This means that at least one of the residues $X_1$, $X_2$ or $X_3$ in general formula (II) denotes a hydrolyzable residue. This is especially preferably an alkoxy group, i.e., an $OR^1$ residue, where $R^1$ is an alkyl residue with 1 to 40 carbon atoms, in particular 1 to 4 carbon atoms.

The ratio of isocyanate-reactive compound to isocyanate-containing compound is preferably 3:2 to 2:3, especially preferably 2:1.5 to 1.5:2, most especially preferably 1.5:1 to 1:1.5.

The ratio of reactants is preferably selected so that the ratio of NCO group to isocyanate-reactive group, which is preferably an OH group, is from 1.5:1 to 1:1.5, preferably 1.2:1 to 1:1.2, most especially preferably 1.2:1.

Isocyanate-reactive compounds within the scope of the present invention are compounds having an organic basic structure having at least one isocyanate reactive group, preferably a hydroxyl group.

These organic basic structures are preferably the same as the organic basic structures [Y] described in formula (I) and (II).

Suitable organic basic structures containing hydroxyl groups as isocyanate-reactive groups may preferably include polymeric compounds such as alkyd resins, oil-modified alkyd resins, unsaturated polyesters, natural oils, e.g. linseed oil, tung oil, soybean oil and epoxides, polyamides, thermoplastic polyesters, e.g. polyethylene terephthalate and polybutylene terephthalate, polycarbonates, polyalkylenes, polyethylenes, polybutylenes, polystyrenes, polypropylenes, ethylene-propylene copolymers and terpolymers, acrylates, e.g. homopolymers and copolymers of acrylic acid, acrylates, methacrylates, acrylamides, their salts and the like, phenolic resins, polyoxymethylene homopolymers and copolymers, polyurethanes, polysulfones, polyoxyalkylene, polysulfide rubbers, nitrocellulose, vinyl butyrate, vinyl polymers, e.g. vinyl chloride-containing polymers and/or vinyl acetate-containing polymers, ethyl cellulose, cellulose acetates and butyrates, rayon, shellac, waxes, ethylene copolymers, e.g. ethylene-vinyl acetate copolymers, ethylene-acrylic acid copolymers, ethylene-acrylate copolymers, organic rubbers, silicone resins and the like. Other examples include polyethers such as polyethylene oxide, polypropylene oxide, propylene glycol and polytetrahydrofuran, polyol, poly(meth)acrylate, polyvinyl alcohol.

Preferred organic basic structures include polyethers, polyesters, polyurethanes and polyols. In an especially preferred form, the organic basic structure is a polyoxyalkylene polymer which has been synthesized by a ring-opening polymerization of an oxyalkylene compound by double metal cyanide catalysis.

The aforementioned organic basic structures have as end group at least one, preferably several hydroxyl groups as isocyanate-reactive groups.

Organic basic structure polymers preferably include compounds or mixtures thereof, including copolymers.

In a preferred embodiment such an organic basic structure which has at least one isocyanate-reactive group has an average OH functionality (average number of OH groups per organic basic structure) of at least approximately 1.6 to approximately 3.0, preferably at least approximately 1.7 to approximately 2.2, especially preferably at least approximately 1.8 to approximately 2.0, in particular preferably at least approximately 1.9 to approximately 2.0.

The OH functionality of a polyether here especially preferably amounts to at least approximately 1.93 to approximately 2.0, most especially preferably approximately 1.95 or approximately 1.98 to approximately 2.0.

Isocyanate-containing silane compounds within the scope of the present invention are compounds according to formula (VII) which have at least one reactive silyl group according to the silicon structural element formula (III) and at least one isocyanate group (—N=C=O)

$$(X_3)(X_2)(X_1)Si\text{-}T\text{-}N=C=O \qquad (VII)$$

where $X_1$, $X_2$, $X_3$ and T have the same meanings as above. There is preferably an alkyl residue selected from —$CH_2$ (methylene), —$CH_2$—$CH_2$ (ethylene), —$CH_2$—$CH_2$—$CH_2$ (propylene), —$CH_2$—$CH_2$—$CH_2$—$CH_2$ (butylene), —$CH_2$—$CH_2$—$CH_2$—$CH_2$—$CH_2$ (hexylene), —$CH_2$—$CH_2$—$CH_2$—$CH_2$—$CH_2$—$CH_2$ (heptylene), —$CH_2$—$CH_2$—$CH_2$—$CH_2$—$CH_2$—$CH_2$—$CH_2$ (octylene) but also the branched derivatives thereof such as isopropylene, tert-butylene. Most especially preferably T is —$CH_2$ (methylene), —$CH_2$—$CH_2$ (ethylene), —$CH_2$—$CH_2$—$CH_2$ (propylene). Suitable isocyanate-containing compounds are preferably methyldimethoxysilylmethyl isocyanate, trimethyoxysilylmethyl isocyanate, diethylmethoxysilylmethyl isocyanate, ethyldimethoxysilylmethyl isocyanate, methyldiethoxysilylmethyl isocyanate, triethoxysilylmethyl isocyanate, ethyldiethoxysilylmethyl isocyanate, methyldimethoxysilylethyl isocyanate, trimethyoxysilylethyl isocyanate, ethyl-dimethoxysilylethyl isocyanate, methyldiethoxysilylethyl isocyanate, triethoxy-silylethyl isocyanate, ethyldiethoxysilylethyl isocyanate, methyldimethoxy-silylpropyl isocyanate, trimethyoxysilylpropyl isocyanate, ethyldimethoxy-silylpropyl isocyanate, methyldiethoxysilylpropyl isocyanate, triethoxysilylpropyl isocyanate, ethyldiethoxysilylpropyl isocyanate, methyldimethoxysilylbutyl isocyanate, trimethoxysilylbutyl isocyanate, triethylsilylbutyl isocyanate, diethylmethoxysilylbutyl isocyanate, ethyldimethoxysilylbutyl isocyanate, methyldiethoxysilylbutyl isocyanate, triethoxysilylbutyl isocyanate, diethylethoxysilylbutyl isocyanate, ethyldiethoxysilylbutyl isocyanate, methyl-dimethoxysilylpentyl isocyanate, trimethoxysilylpentyl isocyanate, triethyl-silylpentyl isocyanate, ethyldimethoxysilylpentyl isocyanate, methyldiethoxy-silylpentyl isocyanate, triethoxysilylpentyl isocyanate, diethylethoxysilylpentyl isocyanate, ethyldiethoxysilylpentyl isocyanate, methyldimethoxysilylhexyl isocyanate, trimethoxysilylpentyl isocyanate, ethyldiethoxysilylpentyl isocyanate, methyldimethoxysilylhexyl isocyanate, trimethoxysilylhexyl isocyanate, ethyldimethoxysilylhexyl isocyanate, methyldiethoxysilylhexyl isocyanate, triethoxysilylhexyl isocyanate, ethyldiethoxysilylhexyl isocyanate, γ-trimethoxysiloxydimethylsilylpropyl isocyanate, γ-trimethylsiloxydimethoxysilylpropyl isocyanate γ-triethoxysiloxydiethylpropyl isocyanate, γ-triethoxysiloxydiethoxysilylpropyl isocyanate or mixtures of two or more thereof.

Isocyanate-containing compounds within the scope of the present invention are compounds according to formula (VIII) having at least one isocyanate group (—N═C═O) but no silyl group in the molecule:

$$R^5\text{—N}═C═O \qquad \text{(VIII)}$$

$R^5$ may denote any conceivable residues, preferably a substituted or unsubstituted, cyclic or non-cyclic alkyl residue with 1 to 40 carbon atoms, substituted or unsubstituted alkenyl residue with 1 to 40 carbon atoms, preferably substituted or unsubstituted aromatic with 6 carbon atoms to 10 carbon atoms, where two condensed aromatics are also possible, ether compounds or ester compounds.

Suitable isocyanate-containing compounds within the scope of the present invention are preferably n-butyl isocyanate, phenyl isocyanate, 4-isopropylphenyl isocyanate, p-toluene isocyanate, 3-chloro-4-methylphenyl isocyanate, 4-trifluoromethoxyphenyl isocyanate, ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis(2-isocyanatoethyl) fumarate, as well as mixtures of two or more thereof, 1-isocyanato-3,3,5-trimethyl-5-isocyanatomethyl cyclohexane (isophorone diisocyanate, IPDI), 2,4- and 2,6-hexahydrotoluene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethyl-hexane, xylylene diisocyanate (XDI), tetramethylxylylene diisocyanate (TMXDI), 1,3- and 1,4-phenylene diisocyanate, 2,4- or 2,6-toluene diisocyanate (TDI), 2,4'-diphenylmethane diisocyanate, 2,2'-diphenylmethane diisocyanate, or 4,4'-diphenylmethane diisocyanate (MDI) or their partially or completely hydrogenated cycloalkyl derivatives, e.g. completely hydrogenated MDI (H12-MDI), alkyl-substituted diphenylmethane diisocyanates, e.g. mono-, di-, tri- or tetraalkyl-diphenylene ethane diisocyanate and their partially or completely hydrogenated cycloalkyl derivatives, 4,4'-diisocyanatophenyl perfluoroethane, phthalic acid bis-isocyanatoethyl ester, 1-chloromethylphenyl 2,4- or 2,6-diisocyanate, 1-bromomethylphenyl 2,4- or -2,6-diisocyanate, 3,3-bis-chloromethyl ether 4,4'-diphenyl diisocyanate, sulfur-containing diisocyanates such as those obtainably by reacting 2 mol diisocyanate with 1 mol thiodiglycol or dihydroxydihexyl sulfide, di- and triisocyanates of dimeric and trimeric fatty acids or mixtures of two or more of the aforementioned diisocyanates.

In a preferred embodiment, the polymer A in the inventive curable composition is a compound of general formula (IX)

$$[Y]\text{—}[Z\text{-}T\text{-}Si\,(X_1)(X_2)(X_3)]_q \qquad \text{(IX)}$$

where Y, $X_1$, $X_2$, $X_3$, T and Z have the same meanings as those described above and q may be a number from 2 to 20. Preferably q is selected so that polymer A represents a star-shaped compound, where the ends are terminated with reactive silyl groups $(Si(X_1)(X_2)(X_3))$, which may crosslink by forming siloxane bonds. Therefore, q is preferably 3, 4, 5, 6 or 7, most especially preferably 3, 4 or 5.

In a preferred embodiment, the average molecular weight $M_w$ or the organic basic structure [Y] in formulas (I), (II) and/or (IX) is from 3000 to 50,000 g/mol, preferably 5000 to 20,000 or 25,000 g/mol, preferably 4000 to 18,000 g/mol, most especially preferably 10,000 to 18,000 g/mol, in particular 12,000 to 18,000 g/mol and 15,000 to 18,000 g/mol. Average molecular weights of 8000 to 19,000 g/mol are also especially preferred.

These molecular weights are especially preferred because compositions with these molecular weights have viscosities which allow easy processability. It is also conceivable to use polymers having a higher molecular weight. If the viscosity of the inventive composition is higher than desired because of a high molecular weight, for example, or stronger internal bonding forces, the processing viscosity can be adjusted by adding reactive diluents or plasticizers and thus a preparation having the desired properties can be produced.

The weight-average molecular weight $M_w$ can be determined by gel permeation chromatography (GPS, also SEC). Those skilled in the art are familiar with this method.

In another preferred embodiment, the organic basic structure (Y) in the inventive curable compositions preferably has an average molecular weight $(M_w)$ of at least 4000 and a polydispersivity PD $(M_w/M_n)$ of less than 4.8, preferably less than 1.7.

However, the polydispersivity PD preferably amounts to less than 1.7, in particular less than 1.5. It is especially preferred if the PD is less than approximately 1.45 and especially preferably less than approximately 1.4.

Especially advantageous viscoelastic properties can be achieved by using as the organic basic structure high-molecular polyoxyalkylene polymers which have a narrow molecular weight distribution and thus a low polydispersivity. Such polyoxyalkylene copolymers are advantageously obtainable by so-called double metal cyanide catalysis or by catalysis using cesium hydroxide or phosphazene compounds and/or salts. Polyoxyalkylene polymers produced in this way are characterized by an especially narrow molecular weight distribution, by an especially high average molecular weight and by a very low number of double bonds at the ends of the polymer chains. Such polyoxyalkylene polymers have a polydispersivity PD $(M_w/M_n)$ of at most 1.7.

Especially preferred organic basic structures include, for example, these polyoxyalkylenes having a polydispersivity of approximately 1.01 to approximately 1.3 in particular approximately 1.05 to approximately 1.18, e.g. approximately 1.08 to approximately 1.11 or approximately 1.12 to approximately 1.14.

In a preferred embodiment of the invention these polyoxyalkylenes have an average molecular weight $(M_w)$ of approximately 5000 to approximately 30,000, in particular approximately 6000 to approximately 25,000. Polyoxyalkylenes having an average molecular weight of approximately 10,000 to approximately 22,000, in particular having average molecular weights of approximately 12,000 to approximately 18,000 are especially preferred.

In another preferred embodiment, the organic basic structure (Y) has one or more silyl groups that are not capable of forming siloxane bonds, however, and thus are not capable of contributing to the crosslinking.

In another preferred embodiment, polymer A in the inventive curable compositions preferably has on the average at least more than 1.0, in particular more than 1.2, preferably more than 1.5, most especially preferably more than 1.8 reactive silyl group in the molecule. According to a preferred embodiment, polymer A in the inventive curable composition on the average has at least more than 1.8 reactive silyl groups in the molecule, especially preferably at least approximately 1.93 to approximately 2.0, most especially approximately 1.95 or approximately 1.98 to approximately 2.0.

In another preferred embodiment, polymer B in the inventive curable compositions preferably has on the average 1.0 to 1.8 reactive silyl groups in the molecular, preferably 1.2 to 1.8.

In another preferred embodiment of the present invention, polymer A has on the average 0.4 to 6% by weight (wt %) reactive silyl groups, based on the total amount of the polymer.

Polymer A preferably has at least 0.55 wt %, in particular at least 0.65 wt %, approximately 0.9 to 6 wt %, especially preferably approximately 1.1 to 6 wt %, in particular approximately 1.3 to 5.85 wt % reactive silyl groups in the molecule.

In another preferred embodiment of the present invention, the polymer B has on the average 0.4 to 4 wt % reactive silyl groups, based on the total amount of the polymer. Polymer B preferably has at least 0.55 wt %, in particular 0.65 wt %, in particular approximately 0.65 to 4 wt %, especially preferably approximately 1 to 3.95 wt %, most especially preferably approximately 1.1 to 2.92 wt % reactive silyl groups in the molecule.

In another preferred embodiment, the present curable compositions have a viscosity of less than 150,000 mPas, preferably less than 100,000 mPas. Advantageously the present curable compositions even have a viscosity of less than 20,000 mPas, in particular approximately 1000 to 10,000, preferably 3000 to 6000 mPas (Brookfield RVT, 23° C., Spindle 7, 2.5 rpm).

In another preferred embodiment, polymer A and polymer B of the present inventive curable compositions have the same organic basic structure (Y).

In another preferred embodiment, Z and Z' in formula (I) and/or (II) are each a carbamate group (IV).

Carbamate groups in this position in polymer A and/or polymer B improve in particular the viscoelastic and/or plastic properties of the cured compositions and the processability of the curable compositions.

For example, if urea groups are in this position instead of carbamate groups, then the compositions often have inferior material properties. Urea groups are so-called "hard segments" which in many materials lead to an exacerbation of the viscoelastic properties.

For example, at least the processability is exacerbated because the viscosity is increased. However, the resulting material is also made harder and more brittle by the urea group in polymer A and/or polymer B and loses its restoring force. Likewise, such a material is not sufficiently stable at least at low temperatures.

In another preferred embodiment, the inventive curable compositions contain another polymer C according to the general formula (X)

$$R^2\text{—}Z\text{—}[Y]\text{—}Z'\text{—}R^2 \qquad (X)$$

where Z and Z' independently of one another denote a carbamate, carboxyl, carbonate or sulfonate group or an oxygen atom,
[Y] is an organic basic structure,
$R^2$ is a linear or branched, substituted or unsubstituted alkyl, acyl or aryl residue with 1 to 40 carbon atoms or a silyl group, which is not capable of forming a siloxane bond.

The present invention also relates to preparations containing the inventive curable compositions.

These are in particular preparations comprising (i) at least one polymer A having at least one reactive silyl group and (ii) at least one polymer B having at least one reactive silyl group, where the number of reactive silyl groups in (i) is greater than or equal to the number of silyl groups in (ii), and the reactive silyl groups crosslink to form siloxane bonds.

Likewise, these are preparations, the curable composition obtainable by reaction of at least one isocyanate-reactive compound with at least one first isocyanate-containing silane compound and with at least one second isocyanate-containing compound, whereby the reaction product comprises at least two polymeric compounds A and B, each of which has at least one reactive silyl group.

In particular preparations in which Z and Z' in polymer A (formula (I)) and/or polymer b (formula (II)) denote a carbamate group are preferred.

The inventive preparations may contain additional ingredients for adhesive, sealing and coating compounds with which those skilled in the art are familiar.

Thus the preparations may contain compounds selected from the group comprising plasticizers, moisture stabilizers, antioxidants, catalysts, curing agents, fillers, reactive diluents, desiccants, adhesives, UV stabilizers, rheological aids and/or solvents.

The inventive curable compositions containing at least one polymer A and one polymer B, each having at least one silyl group may be used in their final application in the form already described within the scope of the inventive use proposals. As a rule, however, it is advantageous if the inventive compositions are used in a preparation containing other additional ingredients, e.g. to regulate the viscosity and/or the material properties.

Accordingly, another subject matter of the present invention is a preparation containing the inventive curable compositions.

Preferably such a preparation additionally contains one or more compounds selected from the group comprising plasticizers, stabilizers, antioxidants, catalysts, fillers, reactive diluents, desiccants, adhesives and UV stabilizers, rheological aids, coloring agents, water scavengers, age inhibitors, thickeners.

Additional additives such as solvents, lubricants, foaming agents may be formulated into the preparations as needed.

For example, it is possible for the viscosity of the inventive curable composition to be too high for certain applications. However, it has been found that the viscosity of the inventive composition can usually be reduced easily and expediently by using a "reactive diluent" without any significantly negative effect on the material properties of the cured composition, e.g. due to separation phenomena (e.g. plasticizer migration) in the cured compound.

A polyurethane, for example, having at least one end group that is reactive with water, in particular an NCO group or an alkoxysilane group or both, whose molecular weight ($M_w$) is at most 10,000 is suitable as the reactive diluent.

The reactive diluent preferably has at least one functional group, which is capable of reacting with a reactive group of the inventive curable composition with chain lengthening and/or crosslinking under the influence of moisture (reactive diluent). The at least one functional group may be any of the functional groups that react under the influence of moisture with crosslinking and/or chain lengthening.

Suitable reactive diluents include all polymeric compounds which leave the material properties of the product formed after curing or crosslinking largely unaffected or at least do not have such a negative influence that the resulting product is unusable. For example, polyesters, polyethers, polymers of compounds with olefinically unsaturated double bond or polyurethanes if the prerequisites mentioned above are met, are suitable.

The reactive diluents are preferably, however, polyurethanes having at least one alkoxysilane group as the reactive group.

The reactive diluents may have one or more functional groups but preferably the number of functional groups is 1 to approximately 6, in particular approximately 2 to approximately 4, e.g. approximately 3.

The viscosity of the reactive diluents in a preferred embodiment is less than approximately 20,000 mPas, in particular approximately 1000 to approximately 10,000 mPas, e.g. approximately 3000 mPas to approximately 6000 mPas (Brookfield RVT, 23° C., spindle 7, 2.5 rpm). Approximately 0.1-6000 mPas is especially preferred, most especially preferred is 1-1000 mPas.

The reactive diluents that may be used within the scope of the inventive process may have any molecular weight distribution (PD) and can thus be synthesized by the conventional methods of polymer chemistry.

Polyurethanes that can be synthesized from a polyol component and an isocyanate component and subsequent functionalization with one or more alkoxysilyl groups are preferably used as the reactive diluents.

The term "polyol component" includes within the scope of the present text, a single polyol or a mixture of two or more polyols that may be used to synthesize polyurethanes. A polyol is understood to be a polyfunctional alcohol, i.e., a compound with more than one OH group in the molecule.

A plurality of polyols may be used as the polyol component for synthesis of the reactive diluents. For example, these include aliphatic alcohols with 2 to 4 OH groups per molecule. The OH groups may be both primary and secondary. Suitable aliphatic alcohols include, for example, ethylene glycol, propylene glycol and similar polyfunctional alcohols.

Polyethers modified by vinyl polymers are also suitable for use as the polyol component. Such products are obtainable, for example, by polymerizing styrene and/or acrylonitrile in the presence of polyethers.

Also suitable as polyol components for synthesis of the reactive diluent are polyester polyols having a molecular weight of approximately 200 to approximately 5000. For example, polyester polyols obtained by the reaction of low-molecular alcohols, in particular ethylene glycol, diethylene glycol, neopentyl glycol, hexanediol, butanediol, propylene glycol, glycerol or trimethylpropane with caprolactone, as already described above, may be used. As already mentioned, polyfunctional alcohols likewise suitable for synthesis of polyester polyols include 1,4-hydroxymethyl cyclohexane, 2-methyl-1,3-propanediol, butanediol-1,2,4, triethylene glycol, tetraethylene glycol, polyethylene glycol, dipropylene glycol, polypropylene glycol, dibutylene glycol and polybutylene glycol.

Other suitable polyester polyols can be synthesized by polycondensation, as already described above. Thus difunctional and/or trifunctional alcohols with a substoichiometric amount of dicarboxylic acids and/or tricarboxylic acids or their reactive derivatives may be condensed to form polyester polyols. Suitable dicarboxylic acids and tricarboxylic acids as well as suitable alcohols have already been listed above.

Especially preferred polyols for use as the polyol component for synthesis of the reactive diluents within the scope of the present invention include, for example, dipropylene glycol and/or polypropylene glycol with a molecular weight of approximately 400 to approximately 2500 as well as polyester polyols, preferably polyester polyols obtainable by polycondensation of hexanediol, ethylene glycol, diethylene glycol or neopentyl glycol or mixtures of two or more thereof and isophthalic acid or adipic acid or mixtures thereof.

Polyacetals are also suitable as the polyol component for synthesis of the reactive diluents. Polyacetals are understood to be compounds such as those obtainable from glycols, e.g. diethylene glycol or hexanediol with formaldehyde. Polyacetals that may be used within the scope of the present invention may also be obtained by polymerization of cyclic acetals.

Polycarbonate may also be used as polyols for synthesis of the reactive diluents. Polycarbonates can be obtained, e.g. by reaction of diols such as propylene glycol, 1,4-butanediol or 1,6-hexanediol, diethylene glycol, triethylene glycol or tetraethylene glycol or mixtures of two or more thereof with diaryl carbonates, e.g. diphenyl carbonate or phosgene.

Also suitable as the polyol components for synthesis of the reactive diluents are polyacrylates having OH groups. These polyacrylates are obtainable, for example, by polymerization of ethylenically unsaturated monomers having an OH group. Such monomers are obtained, for example, by esterification of ethylenically unsaturated carboxylic acids and difunctional alcohols, whereby the alcohol is usually present in a slight excess. Ethylenically unsaturated carboxylic acids suitable for this purpose include, for example, acrylic acid, methacrylic acid, crotonic acid or maleic acid. Corresponding esters containing OH groups include, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

To synthesize the reactive diluents preferred according to the present invention, the corresponding polyol component is reacted with at least one difunctional isocyanate. Essentially any isocyanate having at least two isocyanate groups may be considered as the at least difunctional isocyanate (polyisocyanate) but as a rule, compounds with two to four isocyanate groups, in particular with two isocyanate groups are preferred within the scope of the present invention.

The compound present as a reactive diluent within the scope of the present invention preferably has at least one alkoxysilane group such that of the alkoxysilane groups, the di- and trialkoxysilane groups are preferred.

Suitable polyisocyanates for synthesis of a reactive diluent include, for example, ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane 1,3- and 1,4-diisocyanate, bis(2-isocyanatoethyl)fumarate, as well as mixtures of two or more thereof, 1-isocyanato-3,3,5-trimethyl-5-isocyanatomethyl cyclohexane (isophorone diisocyanate, IPDI), 2,4- and 2,6-hexahydrotoluene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetra-methylxylylene diisocyanate (TMXDI), 1,3- and 1,4-phenylene diisocyanate, 2,4- or 2,6-toluene diisocyanate (TDI), 2,4'-diphenylmethane diisocyanate, 2,2'-diphenylmethane diisocyanate, or 4,4'-diphenylmethane diisocyanate (MDI) or their partially or completely hydrogenated cycloalkyl derivatives, e.g. fully hydrogenated MDI (H12-MDI), alkyl-substituted diphenylmethane diisocyanates, e.g. mono-, di-, tri- or tetraalkyldiphenylmethane diisocyanate as well as their partially or completely hydrogenated cycloalkyl derivatives, 4,4'-diisocyanatophenyl perfluoroethane, phthalic acid bis-isocyanatoethyl ester, 1-chloromethylphenyl-2,4- or -2,6-diisocyanate, 1-bromomethyl-phenyl 2,4- or 2,6-diisocyanate, 3,3-bischloromethyl ether-4,4'-diphenyl diisocyanate, sulfur-containing diisocyanates such as those obtainable by reaction of 2 mol diisocyanate, with 1 mol thiodiglycol or dihydroxydihexyl sulfide; the di- and triisocyanates of the di- and trimer fatty acids or mixtures of two or more of the aforementioned diisocyanates.

Likewise, trivalent or higher isocyanates such as those obtainable, e.g. by oligimerization of diisocyanates, in particular by oligomerization of the aforementioned isocyanates may be used as the polyisocyanates. Examples of such trivalent and higher polyisocyanates include the triisocyanurates of HDI or IPDI or mixtures thereof or their mixed triisocyanurates as well as polyphenylmethylene polyisocyanate as obtainable by phosgenation of aniline formaldehyde condensation products.

In addition, the following substances may be used as reactive diluents, e.g.: polyalkylene glycols reacted with isocyanatosilanes, carbamatopropyl trimethoxysilane, alkyl trimethoxysilane, alkyltriethoxysilane, such as methyl trimethoxysilane, methyltriethoxysilane and vinyltrimethoxysilane, vinyltriethoxysilane, phenyltriethoxysilane, vinyl triacetoxysilane, isooctyl trimethoxysilane, isooctyltriethoxysilane, N-trimethoxysilylmethyl-O-methyl carbamate, N-dimethoxy(methyl)silylmethyl-O-methyl carbamate, hexadecyl trimethoxysilane, 3-octanoylthio-1-propyltriethoxysilane and partial hydrolyzates of these compounds.

To reduce the viscosity of the inventive composition, a plasticizer may also be used in addition to or instead of a reactive diluent.

For example, esters of abietic acid ester, adipic acid ester, azelaic acid ester, benzoic acid ester, butyric acid esters, acetic acid ester, esters of higher fatty acids with approximately 8 to approximately 44 carbon atoms such as dioctyl adipate, diisodecyl succinate, dibutyl sebacate or butyl oleate, esters of fatty acids having OH groups or epoxidized fatty acids, fatty acid esters and fats, glycolic acid esters, phosphoric acid esters, phthalic acid esters, linear or branched alcohols having 1 to 12 carbon atoms, e.g. dioctyl phthalate, dibutyl phthalate or butylbenzyl phthalate, propionic acid esters, sebacic acid esters, sulfonic acid esters, thiobutyric acid esters, trimellitic acid esters, citric acid esters and esters based on nitrocellulose and polyvinyl acetate as well as mixtures of two or more thereof are suitable as plasticizers. Especially suitable are the asymmetrical esters of difunctional, aliphatic dicarboxylic acids, e.g. the esterification product of adipic acid monooctyl ester with 2-ethylhexanol (Edenol DOA, Cognis, Düsseldorf).

Likewise suitable as plasticizers are the pure or mixed ethers of monofunctional linear or branched $C_{4-16}$ alcohols or mixtures of two or more different ethers of such alcohols, e.g. dioctyl ethers.

In another preferred embodiment, end-group-capped polyethylene glycols are used. For example, polyethylene or polypropylene glycol di-$C_{1-4}$ alkyl ethers, in particular the dimethyl or diethyl ethers of diethylene glycol or dipropylene glycol as well as mixtures of two or more thereof are used.

Especially preferred, however, are end-group-capped polyethylene glycols, e.g. polyethylene or polypropylene glycol dialkyl ethers, where the alkyl residue has 1 to 4 carbon atoms, and in particular the dimethyl and diethyl ethers of diethylene glycol and dipropylene glycol. An acceptable curing is achieved in particular with dimethyldiethylene glycol, even under less favorable application conditions (low atmospheric humidity, low temperature). For additional details regarding plasticizers, reference is made to the relevant literature on industrial chemistry.

Diurethanes are also suitable as plasticizers within the scope of the present invention. Diurethanes can be synthesized, for example, by reacting diols with OH end groups with monofunctional isocyanates by selecting the stoichiometry so that essentially all free OH groups react. Excess isocyanate may optionally then be removed from the reaction mixture by distillation, for example. Another method of synthesizing diurethanes is to react monofunctional alcohols with diisocyanates, whereupon all the NCO groups react if possible.

To synthesize the diurethanes based on diols, diols with 2 up to approximately 22 carbon atoms may be used, e.g. ethylene glycol, propylene glycol, 1,2-propanediol, dibutanediol, hexanediol, octanediol or technical-grade mixtures of hydroxy fatty alcohols with approximately 14 carbon atoms, in particular hydroxystearyl alcohol. Linear diol mixtures, in particular those containing polypropylene glycol with an average molecular weight ($M_n$) of approximately 1000 to approximately 6000 are preferably contained in amounts of more than approximately 50 wt %, in particular more than approximately 70 wt %. Most especially preferred are diurethanes exclusively based on propylene glycol with the same or different average molecular weights from approximately 1000 to approximately 4000. The free OH groups of the diol mixtures are essentially all reacted with aromatic or aliphatic monoisocyanates or mixtures thereof. Preferred monoisocyanates include phenyl isocyanate or toluene isocyanate or mixtures thereof.

To synthesize the diurethanes based on diisocyanates, aromatic or aliphatic diisocyanates or mixtures thereof are used. For example, the isocyanates such as those indicated above as being suitable for synthesis of the inventive polyurethane, preferably toluene diisocyanate (TDI) are suitable as the aromatic or aliphatic diisocyanates. The free NCO groups of the diisocyanates are essentially completely reacted with monofunctional alcohols preferably linear monofunctional alcohols or mixtures of two or more different monofunctional alcohols. Especially suitable are mixtures of linear monofunctional alcohols. Suitable monoalcohols include, for example, monoalcohols with 1 to approximately 24 carbon atoms, e.g. methanol, ethanol, the positional isomers of propanol, butanol, pentanol, hexanol, heptanol, octanol, decanol or dodecanol in particular the respective 1-hydroxy compounds as well as mixtures of two or more thereof. Also suitable are the so-called "technical-grade mixtures" of alcohols and end-group-capped polyalkylene glycol ethers. Alcohol mixtures containing polypropylene glycol monoalkyl ethers with an average molecular weight ($M_n$) of approximately 200 to approximately 2000 in an amount of more than approximately 50 wt %, preferably more than approximately 70 wt %, based on the alcohol mixture are especially suitable. Diurethanes based on diisocyanates whose free NCO groups have reacted completely by polypropylene glycol monoalkyl ether with an average molecular weight of approximately 500 to approximately 2000 are especially preferred.

In addition to reactive diluents and plasticizers, the inventive preparation may also contain other additives which usually serve to modify certain material properties of the preparation before or after processing or to promote the stability of the preparation before or after processing.

It is often advisable to stabilize the inventive preparations with respect to penetrating moisture in order to increase storability (shelf-life). Such an improvement in shelf-life can be achieved by using stabilizers, for example. Suitable stabilizers include all compounds that react with water to form a group that is inert with respect to the reactive groups present in the preparation and thereby undergo the least possible changes in their molecular weight.

Suitable stabilizers include, for example, preferably isocyanates or silanes. Suitable silanes include, for example, (methoxycarbonylaminomethyl)trimethoysilane, vinylsilanes such as 3-vinylpropyltriethoxysilane, vinyl-trimethoxysilane, oxime silanes, such as methyl-O,O',O"-butan-2-one trioxime silane or O,O', O", O□-butan-2-one tetraoximosilane (CAS no. 022984-54-9 and 034206-40-1) or benzamidosilanes such as bis(N-methyl-benzamido)methylethoxysilane (CAS no. 16230-35-6).

The inventive preparation usually contains approximately 0 to approximately 6 wt % stabilizers.

The inventive preparation may also contain up to approximately 7 wt %, particular approximately 3 wt % to approximately 5 wt % antioxidants.

Stabilizers or antioxidants that may be used as additives within the scope of the present invention include hindered phenols of a high molecular weight ($M_w$), polyfunctional phenols and sulfur-containing and phosphorus-containing phenols. Phenols usable as additives within the scope of the present invention include, for example, 1,3,5-trimethyl-2,4,6-tris(3,5-di-tert-butyl-4-hydroxybenzyl)benzene, pentaerythritol tetrakis-3-(3,5-di-tert-butyl-4-hydroxyphenyl)propionate, n-octadecyl-3,5-di-tert-butyl-4-hydroxyphenyl)propionate, 4,4-methylene-bis(2,6-di-tert-butylphenol), 4,4-thiobis(6-tert-butyl-o-cresol), 2,6-di-tert-butylphenol, 2,4-dimethyl-6-tert-butylphenol, 2,2'-methylene-bis-(4-methyl-6-tert-butylphenol), 4,4'-butylidene-bis-(3-methyl-6-tert-butylphenol), 4,4'-thiobis(3-methyl-6-tert-butylphenol), 2,6-di-tert-butyl-p-cresol, 6-(4-hydroxyphenoxy)-2,4-bis(n-octylthio)-1,3,5-triazine, tetrakis-[methylene-3-(3,5-di-tert-butyl-4-hydroxyphenyl)propionate]methane, 1,1,3-tris(2-methyl-4-hydroxy-4-tert-butylphenyl)butane, di-n-octadecyl-3,5-di-tert-butyl-4-hydroxy-benzylphosphonate, 2-(n-octylthio)ethyl-3,5-di-tert-butyl-4-hydroxybenzoate and sorbitol hexa[3-(3,5-di-tert-buytyl-4-hydroxyphenyl) propionate].

Suitable photostabilizers include, for example, those available commercially under the name Tinuvin® (manufacturer Ciba Geigy)

The α-silanes preferred as adhesives, desiccants and/or reactive diluents are preferably selectable from the group consisting of α-amino, α-methacryl, α-carbamatosilanes and α-alkoxysilanes. Suitable examples include N-cyclohexylaminomethylmethyl diethoxysilane, N-cyclohexylaminomethyltriethoxysilane, N-phenylaminomethyltriethoxysilane, (methacryloxymethyl)methyl diethoxysilane and methacryloxymethyltriethoxysilane, N-(triethoxysilylmethyl)-O-methylcarbamate and N-(methyldiethoxysilylmethyl)-O-methylcarbamate.

Suitable catalysts to promote crosslinking and/or control the curing rate include in particular aliphatic monoamines, diamines, polyamines and heterocyclic amines and aromatic amines, e.g. butylamine, hexylamine, octylamine, decylamine or laurylamine, ethylenediamine, hexane and/or hexyldiamine, dibutylamine, triethanolamine, triethylenediamine, trimethylaminoethylpiperazine, pentamethyldiethylenetriamine, tetramethyliminobisopropylamine and bis(dimethylaminopropyl)-N-isopropanolamine and dimorpholinodiethyl ether, diethylenetriamine, cyclohexylamine, benzylamine, diethylaminopropylamine, xylylenediamine, guanidine, diphenylguanidine, triethylenetetramine or tetraethylenepentamine, piperidine or piperazine, methaphenylenediamine, 2,4,6-tris(dimethylaminomethyl)phenol, morpholine, N-methylmorpholine, 1,3-diazabicyclo[5.4.6]undec-7-ene (DBU). Additional suitable catalysts include those based on organic or inorganic heavy metal compounds, e.g. cobalt naphthenate, dibutyltin dilaurate, tin mercaptides, tin dichloride, zirconium tetraoctoate, tin naphthenate, tin stearate, antimony dioctoate, lead dioctoate, metal in particular iron acetyl acetonate. In particular all catalysts known for accelerated silanol condensation may be used here. For example, these include organotin, organotitanium, organozirconium or organoaluminum compounds. Examples of such compounds include dibutyltin dilaurate, dibutyltin dimaleate, tin octoate, isopropyl triisostearoyl titanate, isopropyl tris (dioctylpyrophosphate) titanate, bis(dioctylpyrophosphate) oxyacetate titanate, tetrabutyl zirconate, tetrakis(acetylacetonato)zirconium, tetraisobutyl zirconate, butoxy-tris(acetylacetonato)zirconium, tris(ethyl acetoacetato)aluminum. Dibutyltin alkyl esters such as dibutyltin alkyl maleates or dibutyltin laurates are especially suitable, in particular dibutyltin bis-ethyl maleate, dibutyltin bis-butyl maleate, dibutyltin bis-octyl maleate, dibutyltin bisoleyl maleate, dibutyltin bisacetyl acetate, dibutyltin diacetate, dibutyltin dioctoate, dibutyltin oxide, dibutyltin bis-triethoxy silicate and their catalytically active derivatives. The aforementioned catalyst may be used alone or as a mixture of two or more of the aforementioned catalysts.

Amino compounds having an alkoxysilyl group, e.g. 3-amino-propyltrimethoxysilane are also suitable as catalysts.

Preferred catalysts to control the curing rate of the inventive curable compositions include, for example, organometal compounds such as iron or tin compounds, in particular the 1,3-dicarbonyl compounds of iron or of divalent and/or tetravalent tin, the tin(II) carboxylates and/or dialkyltin(IV) dicarboxylates or the corresponding dialkoxylates, e.g. dibutyltin dilaurate, dibutyltin diacetate, dioctyltin diacetate, dibutyltin maleate, tin(II) octoate, tin(II) phenolate or the acetyl acetonates of divalent or tetravalent tin. Furthermore, alkyl titanates, organosilicon titanium compounds or bismuth catalysts, e.g. bismuth tris-2-ethylhexanoate, or acidic compounds, e.g. phosphoric acid, p-toluenesulfonic acid or phthalic acid may also be used.

Furthermore, the following tin compounds are suitable: di(n-butyl)tin(IV) di(methyl maleate), di(n-butyl)tin(IV) di(butyl maleate), di(n-octyl)tin(IV) di(methyl maleate), di(n-octyl)tin(IV) di(butyl maleate), di(n-octyl)tin(IV) di(isooctyl maleate), di(n-butyl)tin(IV) sulfide, di(n-butyrl)tin(IV) oxide, di(n-octyl)tin(IV) oxide, (n-butyl)$_2$Sn (SCH$_2$COO), (n-octyl)$_2$Sn(SCH$_2$COO), (n-octyl)$_2$Sn (SCH$_2$CH$_2$COO), (n-octyl)$_2$Sn (SCH$_2$CH$_2$COOH$_2$CH$_2$OCOCH$_2$S), (n-butyl)$_2$Sn (SCH$_2$COO-i-C$_8$H$_{17}$)$_2$, (n-octyl)$_2$Sn(SCH$_2$COO-i-C$_8$H$_{17}$)$_2$, (n-octyl)$_2$Sn(SCH$_2$COO-n-C$_8$H$_{17}$)$_2$.

Chelating tin organyls may also be used, e.g. di(n-butyl)tin (IV) di(acetyl acetonate), di(n-octyl)tin(IV) di(acetyl acetonate), (n-octyl)(n-butyl)tin(IV) di(acetyl acetonate).

Boron halides, e.g. boron trifluoride, boron trichloride, boron tribromide, boron triiodide or mixed boron halides may also be used as curing catalysts. Boron trifluoride complexes, e.g. boron trifluoride-diethyl etherate which are easier to handle as liquids than the gaseous boron halides are especially preferred.

Furthermore, titanium, aluminum and zirconium compounds or mixtures of one or more catalysts from one or more of the aforementioned groups may preferably also be used as catalysts. These catalysts are suitable as curing catalysts for the alkoxysilane polymers. First, this makes it possible to avoid the use of tin compounds but also better adhesion to organic surfaces, where adhesion is normally poor, e.g. acrylates can be improved in this way. Of the titanium, aluminum and zirconium catalysts, the titanium catalyst are preferred because the best curing results are obtained with them.

Suitable titanium catalysts include compounds having hydroxyl groups and/or substitute or unsubstituted alkoxy groups, i.e., titanium alkoxides of the general formula

where $R^z$ is an organic group, preferably a substituted or unsubstituted hydrocarbon group with 1 to 20 carbon atoms and the four alkoxy groups $OR^z$ are the same or different. Furthermore, one or more of the $OR^z$ residues may be replaced by acyloxy groups $OCOR^z$.

Also suitable as titanium catalysts are the titanium alkoxide in which one or more alkoxy groups are replaced by halogen atoms.

For example, the following mixed or non-mixed-substituted titanium alkoxides may be used as the titanium catalyst: tetramethoxytitanium, tetraethoxytitanium, tetraallyloxytitanium, tetra-n-propoxytitanium, tetraisopropoxytitanium, tetra-n-butoxytitanium, tetraisobutoxytitanium, tetra(2-butoxy)titanium, tetra(t-butoxy)titanium, tetrapentoxy(titanium), tetracyclopentoxytitanium, tetrahexoxytitanium, tetracyclohexoxytitanium, tetrabenzoytitanium, tetraoctoxytitanium, tetrakis(2-ethylhexoxy)titaniurn, tetradecoxytitanium, tetradodecoxytitaniurn, tetrastearoytitanium, tetrabutoxytitaniurn dimer, tetrakis(8-hydroxyoctoxy) titanium, titanium diisopropoxy-bis(2-ethyl-1,3-hexanediolate), titanium bis(2-ethylhexyloxy)bis(2-ethyl-1,3-hexanediolate), tetrakis(2-chloroethoxy)titanium, tetrakis(2-bromoethoxy)-titanium, dibutoxydimethoxytitanium, butoxytriethoxytitanium, dibutoxydiethoxy-titanium, butoxytriisopropoxytitanium, dibutoxydiisopropoxytitanium, tetraphen-oxybutane, tetrakis(o-chlorophenoxy)titanium, tetrakis(m-nitro-phenoxy)titanium, tetrakis(p-methylphenoxy) titanium, tetrakis(trimethylsiloxy)titanium.

Furthermore, titanium acylates may be used: triisopropoxytitanium, triisopropoxytitanium methacrylate, diisopropoxytitanium dimethacrylate, isopropoxytitanium trimethacrylate, triisopropoxytitanium hexanoate, triisopropoxytitanium stearate and the like.

For example, the following compounds may be used as halogenated titanium catalysts: triisopropoxytitanium chloride, diisopropoxytitanium chloride, isopropoxytitanium chloride, triisopropoxytitanium bromide, triisopropoxytitanium fluoride, triethoxytitanium chloride, tributoxytitanium chloride.

Furthermore, titanium chelate complexes may be used: dimethoxytitanium bis(ethyl acetoacetate), dimethoxytitanium bis(acetyl acetonate), diethoxytitanium bis(ethyl acetoacetate), diethoxytitanium bis(acetyl acetonate), diisopropoxytitanium bis(ethyl acetoacetate), diisopropoxytitanium bis(methyl acetoacetate), diisopropoxytitanium bis(t-butyl acetoacetate), diisopropoxytitanium bis(methyl-3-oxo-4,4-dimethylhexanoate), diisopropoxytitanium bis(ethyl-3-oxo-4,4,4-trifluorobutanoate), diisopropoxytitanium bis (acetyl acetonate), diisopropoxytitanium bis(2,2,6,6-tetramethyl-3,5-heptanedionate), di(n-butoxy)titanium bis (ethyl acetoacetate), di(n-butoxy)titanium bis(acetyl acetonate), diisobutoxytitanium bis(ethyl acetoacetate), diisobutoxytitanium bis(acetyl acetonate), di(t-butoxy)titanium bis(ethyl acetoacetate), di(t-butoxy)titanium bis(acetyl acetonate), di(2-ethylhexoxy)titanium bis(ethyl acetoacetate), di(2-ethylhexoxy)titanium bis(acetyl acetonate), bis (1-methoxy-2-propoxy)titanium bis(ethyl acetoacetate), bis (3-oxo-2-butoxy)titanium bis(ethyl acetoacetate), bis(3-diethylaminopropoxy)titanium bis(ethyl acetoacetate), triisopropoxytitaniurn (ethyl acetoacetate), triisopropoxytitaniurn (diethylmalonate), triisopropoxytitanium (allyl acetoacetate), triisopropoxytitanium (methacryloxyethyl acetoacetate), 1,2-dioxyethanetitanium bis(ethyl acetoacetate), 1,3-dioxypropanetitanium bis(ethyl acetoacetate), 2,4-dioxypentanetitanium bis(ethyl acetoacetate), 2,4-dimethyl-2,4-dioxypentanetitanium bis(ethyl acetoacetate), diisopropoxytitanium bis(triethanolaminate), tetrakis(ethylacetoacetato)titanium, tetrakis(acetylacetonato)titanium, bis(trimethylsiloxy)titanium bis(ethyl acetoacetate), bis(trimethylsiloxy)titanium bis(acetyl acetonate).

The following titanium chelate complexes are preferred for use here because they are commercially available and have a high catalytic activity: diethoxytitanium bis(ethyl acetoacetate), diethyltitanium bis(acetyl acetonate), diisopropoxytitanium bis(ethyl acetoacetate), diisopropoxytitanium bis (acetyl acetonate), dibutoxytitanium bis(ethyl acetoacetate) and dibutoxytitanium bis(acetyl acetonate). Especially preferred are diethoxytitanium bis(ethyl acetoacetate), diisopropoxytitanium (ethyl acetoacetate) and dibutoxytitanium bis (ethyl acetoacetate), and most especially preferred is diisopropoxytitanium bis(ethyl acetoacetate).

Furthermore, the following titanium catalysts may also be used: isopropoxytitanium tris(dioctyl phosphate), isopropoxytitanium tris(dodecylbenzyl sulfonate), dihydroxytitanium bislactate.

Aluminum catalysts may also be used as curing catalysts, e.g. aluminum alkoxides

where $R^z$ denotes an organic group, preferably a substituted or unsubstituted hydrocarbon residue with 1 to 20 carbon atoms, and the three $R^z$ residues are the same or different.

With the aluminum alkoxides, one or more of the alkoxy residues may also be replaced by acyloxy residues $OC(O)R^z$.

Furthermore, aluminum alkoxides in which one or more alkoxy residues are replaced by halogen groups may also be used.

Of the aluminum catalysts described, the pure aluminum alcoholates are Preferred with regard to their stability with respect to moisture and the curability of the mixtures to which they are added. Furthermore, aluminum chelate complexes are preferred.

For example, the following compounds may be used as aluminum alkoxides: trimethoxyaluminum, triethoxyaluminum, triallyloxyaluminum, tri(n-propoxy)aluminum, tritriisopropoxyaluminum, tri(n-butoxy)aluminum, triisobutoxyaluminum, tri(sec-butoxy)aluminum, tri(tert-butoxy) aluminum, tri(n-pentoxy)aluminum, tricyclopentoxyaluminum, trihexoxyaiuminum, tricyclohexoxyaluminum, tribenzoxyaluminum, trioctoxyaluminum, tris(2-ethylhexoxy)aluminum, tridecoxyaluminum, tridodecoxyaluminum, tristearoxyaluminum, dimeric tributoxyaluminum, tris(8-hydroxyoctoxy)aluminum, isopropoxyaluminum bis(2-ethyl-1,3-hexanediolate), diisopropoxyaluminum (2-ethyl-1,3-hexanediolate), (2-ethylhexoxy)aluminum bis (2-ethyl-1,3-hexanediolate), bis(2-ethylhexyloxy)aluminum (2-ethyl-1,3-hexanediolate), tris(2-chloroethoxy)aluminum, tris(2-bromoethoxy)aluminum, tris(2-methoxyethoxy)aluminum, tris(2-ethoxyethoxy)aluminum, butoxydimethoxyaluminum, methoxydibutoxyaluminum, butoxydiethoxyaluminum, ethoxydibutoxyaluminum, butoxydiisopropoxyaluminum, isopropoxyldibutoxyaluminum, triphenoxyaluminum, tris(o-chlorophenoxy)aluminum, tris(m-nitrophenoxy)aluminum, tris(p-methylphenoxy)aluminum.

For example, aluminum acylates may also be used: diisopropoxyaluminum acrylate, diisopropoxyaluminum methacrylate, isopropoxyaluminum dimethacrylate, diisopropoxyaluminum hexanoate, diisopropoxyaluminum stearate.

Furthermore, aluminum halogen compounds may also be used, e.g. diisopropoxyaluminum chloride, isopropoxyaluminum chloride, diisopropoxyaluminum bromide, diisopropoxyaluminum fluoride, diethoxyaluminum chloride, dibutoxyaluminum chloride.

Aluminum chelate complexes may also be used as catalysts, e.g. methoxyaluminum bis(ethyl acetoacetate), methoxyaluminum bis(acetyl acetonate), ethoxyaluminum bis (ethyl acetoacetate), ethoxyaluminum bis(acetyl acetonate), isopropoxyaluminum bis(ethyl acetoacetate), isopropoxyaluminum bis(methyl acetoacetate), isopropoxyaluminum bis(t-butyl acetoacetate), dimethoxyaluminum (ethyl acetoacetate), dimethoxyaluminum (acetyl acetonate), diethoxyaluminum (ethyl acetoacetate), diethoxyaluminum (acetyl acetonate), diisopropoxyaluminum (ethyl acetoacetate), diisopropoxyaluminum (methyl acetoacetate), diisopropoxyaluminum (t-butyl acetoacetate), isopropoxyaluminum bis(methyl-3-oxo-4,4-dimethylhexanoate), isopropoxyaluminum bis(ethyl-3-oxo-4,4,4-trifluoropentanoate), isopropoxyaluminum bis(acetyl acetonate), isopropoxyaluminum bis(2,2,6,6-tetramethyl-3,5-heptanedionate), n-butoxyaluminum bis(ethyl acetoacetate), n-butoxyaluminum bis(acetyl acetonate), isobutoxyaluminum bis(ethyl acetoacetate), isobutoxyaluminum bis(acetyl acetonate), t-butoxyaluminum bis(ethyl acetoacetate), t-butoxyaluminum bis(acetyl acetonate), 2-ethylhexoxyaluminum bis(ethylacetoacetate), 2-ethylhexoxyaluminum bis(acetyl acetonate), 1,2-dioxyethanealuminum (ethyl acetoacetate), 1,3-dioxypropanealuminum (ethyl acetoacetate), 2,4-dioxypentanealuminum (ethyl acetoacetate), 2,4-dimethyl-2,4-dioxypentanealuminum (ethyl acetoacetate), isopropoxyaluminum bis(triethanolaminate), aluminum tris (ethyl acetoacetate), aluminum tris(acetyl acetonate), aluminum (acetyl acetonate) bis(ethyl acetoacetate).

The following aluminum chelate complexes are preferably used as catalysts because they are commercially available and have high catalytic activities: ethoxyaluminum bis(ethyl acetoacetate), ethoxyaluminum bis(acetyl acetonate), isopropoxyaluminum bis(ethyl acetoacetate), isopropoxyaluminum bis(acetyl acetonate), butoxyaluminum bis(ethyl acetoacetate), butoxy-aluminum bis(acetyl acetonate), dimethoxyaluminum ethyl acetoacetate, dimethoxyaluminum acetyl acetonate, diethoxyaluminum ethyl acetoacetate, diethoxyaluminum acetyl acetonate, diisopropoxyaluminum ethyl acetoacetate, diisopropoxyaluminum methyl acetoacetate and diisopropoxyaluminum (t-butyl acetoacetate).

Especially preferred are ethoxyaluminum bis(ethyl acetoacetate), isopropoxyaluminum bis(ethyl acetoacetate), butoxyaluminum bis(ethyl acetoacetate), dimethoxyaluminum ethyl acetoacetate, diethoxyaluminum ethyl acetoacetate and diisopropoxyaluminum ethyl acetoacetate.

Most especially preferred are isopropoxyaluminum bis (ethyl acetoacetate) and diisopropoxyaluminum ethyl acetoacetate.

Furthermore, the following aluminum catalysts may also be used, e.g.: bis(dioctylphosphato)isopropoxyaluminum, bis(dodecylbenzylsulfonato)-isopropoxyaluminum, hydroxyaluminum bislactate.

Suitable zirconium catalysts include: tetramethoxyzirconium, tetraethoxyzirconium, tetraallyloxyzirconium, tetra-n-propoxyzirconium, tetraisopropoxyzirconium, tetra-n-butoxyzirconium, tetraisobutoxyzirconium, tetra(2-butoxy) zirconium, tetra(t-butoxy)zirconium, tetrapentoxy (zirconium), tetracyclopentoxyzirconium, tetrahexoxyzircnium, tetracyclohexoxyzirconium, tetrabenzoxyzirconium, tetraoctoxyzirconium, tetrakis(2-ethylhexoxy)zirconium, tetradecyzirconium, tetradodecoxyzirconiurn, tetrastearoxyzirconium, tetrabutoxyzirconium dimer, tetrakis(8-hydroxyoctoxy)zirconium, zirconium diisopropoxybis(2-ethyl-1,3-hexanediolate), zirconium bis(2-ethylhexyloxy)-bis(2-ethyl-1,3-hexanediolate), tetrakis(2-chloroethoxy)zirconium, tetrakis-(2-bromoethoxy)zirconium, tetrakis(2-methoxyethoxy)zirconium, tetrakis-(2-ethoxyethoxy)zirconium, butoxytrimethoxyzirconium, dibutoxydiisopropoxyzirconium, butoxytriethoxyzirconium, dibutoxydiethoxyzirconium, butoxytriisopropoxyzirconium, dibutoxydiisopropoxyzirconium, tetraphenoxybutane, tetrakis(o-chlorophenoxy)-zirconium, tetrakis(m-nitrophenoxy)zirconium, tetrakis(p-methylphenoxy)zirconium, tetrakis(trimethylsiloxy)zirconium, diisopropoxyzirconium bis (ethyl acetoacetate), diisopropoxyzirconium bis(acetyl acetonate), dibutoxyzirconium bis(ethyl acetoacetate), dibutoxyzirconium bis(acetyl acetonate), triisopropoxyzirconium ethyl acetoacetate, triisopropoxyzirconium acetyl acetonate, tris(n-butoxy)zirconium ethyl acetoacetate, tris(n-butoxy) zirconium acetyl acetonate, isopropoxyzirconium tris(ethyl acetoacetate), isopropoxyzirconium tris(acetyl acetonate), n-butoxyzirconium tris(ethyl acetoacetate), n-butoxyzirconium tris(acetyl acetonate), n-butoxyzirconium (acetyl acetonate) bis(ethyl acetoacetate).

Preferred for use are, for example, diethoxyzirconium bis (ethyl acetoacetate), diisopropoxyzirconium bis(ethyl acetoacetate), dibutoxyzirconium bis(ethyl acetoacetate), triisopropoxyzirconium (ethyl acetoacetate), tris(n-butoxy)zirconium (ethyl acetoacetate), isopropoxyzirconium tris(ethyl acetoacetate), n-butoxyzirconium tris(ethyl acetoacetate) and n-butoxyzirconium (acetyl acetonate) bis(ethyl acetoacetate).

Most especially preferably diisopropoxyzirconium bis (ethyl acetoacetate), triisopropoxyzirconium (ethyl acetoacetate) and isopropoxyzirconium tris(ethyl acetoacetate) may be used.

Furthermore, for example, zirconium acylates may be used: triisopropoxyzirconium, triisopropoxyzirconium methacrylate, diisopropoxy-zirconium dimethacrylate, isopropoxyzirconium trimethacrylate, triisopropoxy-zirconium hexanoate, triisopropoxyzirconium stearate and the like.

The following compounds may be used as halogenated zirconium catalysts: triisopropoxyzirconium chloride, diisopropoxyzirconium dichloride, isopropoxyzirconium trichloride, triisopropoxyzirconium bromide, triiso-propoxyzirconium fluoride, triethoxyzirconium chloride, tributoxyzirconium chloride.

Furthermore, zirconium chelate complexes may also be used: dimethoxyzirconium bis(ethyl acetoacetate), dimethoxyzirconium bis(acetyl acetonate), diethoxyzirconium bis(ethyl acetoacetate), diethoxyzirconium bis(acetyl acetonate), diisopropoxyzirconium bis(ethyl acetoacetate), diisopropoxyzirconium bis(methyl acetoacetate), diisopropoxyzirconium bis(t-butyl acetoacetate), diisopropoxyzirconium bis(methyl-3-oxo-4,4-dimethylhexanoate), diisopropoxyzirconium bis(ethyl-3-oxo-4,4,4-trifluorobutanoate), diisopropoxyzirconium bis(acetyl acetonate), diisopropoxyzirconium bis(2,2,6,6-tetramethyl-3,5-heptanedionate), di(n-butoxy)zirconium bis(ethyl acetoacetate), di(n-butoxy) zirconium bis(acetyl acetonate), diisobutoxyzirconium bis (ethyl acetoacetate), diisobutoxyzirconium bis(acetyl acetonate), di(t-butoxy)zirconium bis(ethyl acetoacetate), di(t-butoxy)zirconium bis(acetyl acetonate), di(2-ethylhexoxy) zirconium bis(ethyl acetoacetate), di(2-ethylhexoxy) zirconium bis(acetyl acetonate), bis(1-methoxy-2-propoxy) zirconium bis(ethyl acetoacetate), bis(3-oxo-2-butoxy) zirconium bis(ethyl acetoacetate), bis(3-diethylaminopropoxy)zirconium bis(ethyl acetoacetate), triisopropoxyzirconium (ethyl acetoacetate), triisopropoxyzirconium (diethylmalonate), triisopropoxyzirconium (allyl acetoacetate), triisopropoxyzirconium (methacryloxyethyl acetoacetate), 1,2-dioxyethanezirconium bis(ethyl acetoacetate), 1,3-dioxypropanezirconium bis(ethyl acetoacetate), 2,4-dioxypentanezirconium bis(ethyl acetoacetate), 2,4-dimethyl-2,4-dioxypentanezirconium bis(ethyl acetoacetate), diisopropoxyzirconium bis(triethanolaminate), tetrakis(ethylacetoacetato)zirconium, tetrakis(acetylacetonato)

zirconium, bis(trimethylsiloxy)zirconium bis(ethyl acetoacetate), bis(trimethylsiloxy)zirconium bis(acetyl acetonate).

The following zirconium chelate complexes are preferably used because they are commercially available and have a high catalytic activity: diethoxyzirconium bis(ethyl acetoacetate), diethoxyzirconium bis(acetyl acetonate), diisopropylzirconium bis(ethyl acetoacetate), diisopropoxyzirconium (acetyl acetonate), dibutoxyzirconium bis(ethyl acetoacetate) and dibutoxyzirconium bis(acetyl acetonate)

Especially preferred are diethoxyzirconium bis(ethyl acetoacetate), diisopropoxyzirconium (ethyl acetoacetate) and dibutoxyzirconium bis(ethyl acetoacetate), and most especially preferred is diisopropoxyzirconium bis(ethyl acetoacetate).

Furthermore, the following zirconium catalysts may also be used: isopropoxyzirconium tris(dioctylphosphate), isopropylzirconium tris(dodecyl-benzylsulfonate), dihydroxyzirconium bislactate.

Moreover carboxylic acid salts of metals or a mixture of several such salts may be used as curing catalysts, where these are selected from the carboxylates of the following metals: calcium, vanadium, iron, titanium, potassium, barium, manganese, nickel, cobalt and/or zirconium.

Of the carboxylates, the calcium, vanadium, iron, titanium, potassium, barium, manganese and zirconium carboxylates are preferred because they have a high activity.

Especially preferred are calcium, vanadium, iron, titanium and zirconium carboxylates.

Most especially preferred are iron and titanium carboxylates.

For example, the following compounds may be used: iron (II) (2-ethylhexanoate), iron(III) (2-ethylhexanoate), titanium(IV) (2-ethylhexanoate), vanadium(III) (2-ethylhexanoate), calcium(II) (2-ethylhexanoate), potassium 2-ethylhexanoate, barium(II) (2-ethylhexanoate), manganese (II) (2-ethylhexanoate), nickel(II) (2-ethylhexanoate), cobalt (II) (2-ethylhexanoate), zirconium(IV) (2-ethylhexanoate), iron(II) neodecanoate, iron(III) neodecanoate, titanium(IV) neodecanoate, vanadium(III) neodecanoate, calcium(II) neodecanoate, potassium neodecanoate, barium(II) neodecanoate, zirconium(IV) neodecanoate, iron(II) oleate, iron (III) oleate, titanium tetraoleat, vanadium(III) oleate, calcium (II) oleate, potassium oleate, barium(II) oleate, manganese (II) oleate, nickel(II) oleate, cobalt(II) oleate, zirconium(IV) oleate, iron(II) naphthenate, iron(III) naphthenate, titanium (IV) naphthenate, vanadium(III) naphthenate, calcium dinaphthenate, potassium naphthenate, barium dinaphthenate, manganese dinaphthenate, nickel dinaphthenate, cobalt dinaphthenate, zirconium(IV) naphthenate.

With regard to the catalytic activity, iron(II) 2-ethylhexanoate, iron(III) 2-ethylhexanoate, titanium(IV) 2-ethylhexanoate, iron(II) neodecanoate, iron(III) neodecanoate, titanium(IV) neodecanoate, iron(II) oleate, iron(III) oleate, titanium(IV) oleate, iron(II) naphthenate, iron(III) naphthenate and titanium(IV) naphthenate are preferred and iron(III) 2-ethylhexanoate, iron(III) neodecanoate iron(III) oleate and iron(III) naphthenate are especially preferred.

With regard to the non-occurrence of discoloration, the following are preferred: titanium(IV) 2-ethylhexanoate, calcium(II) 2-ethylhexanoate, potassium 2-ethylhexanoate, barium(II) 2-ethylhexanoate, zirconium(IV) 2-ethylhexanoate, titanium(IV) neodecanoate, calcium(II) neodecanoate, potassium neodecanoate, barium(II) neodecanoate, zirconium(IV) neodecanoate, titanium(IV) oleate, calcium (II) oleate, potassium oleate, barium(II) oleate, zirconium (IV) oleate titanium(IV) naphthenate, calcium(II) naphthenate, potassium naphthenate, barium(II) naphthenate and zirconium(IV) naphthenate.

The calcium carboxylates, vanadium carboxylates, iron carboxylates, titanium carboxylates, potassium carboxylates, barium carboxylates, manganese carboxylates, nickel carboxylates, cobalt carboxylates and zirconium carboxylates may be used individually or as mixture of several catalysts of one more of the aforementioned groups. Furthermore, these metal carboxylates may be used in combination with tin carboxylates, lead carboxylates, bismuth carboxylates and cerium carboxylates.

The inventive preparation may contain up to 5 wt %, e.g. approximately 0.002 to approximately 5 wt %, preferably 0.1 to 0.5 wt % of such catalysts in the total amount.

Additional additives which serve to vary certain properties of the preparation may also be contained in it. These may include, for example, dyes such as titanium dioxide, fillers such as talc, clay and the like. If necessary, the inventive adhesives may contain small amounts of thermoplastic polymers or copolymers, e.g. ethylene-vinyl acetate (EVA), ethylene-acrylic acid, ethylene methacrylate and ethylene-n-butyl acrylate copolymers which impart to the adhesive additional flexibility, toughness and strength, if necessary. It is likewise possible to add certain hydrophilic polymers, e.g. polyvinyl alcohol, hydroxyethyl cellulose, hydroxypropyl cellulose, polyvinyl methyl ether, polyethylene oxide, polyvinyl pyrrolidone, polyethyl oxazoline or starch or cellulose ester, e.g. the acetates with a degree of substitution of less than 2.5.

The inventive preparation may contain up to approximately 80 wt % fillers. Suitable fillers include, for example, inorganic compounds that are inert with respect to isocyanates and silanes, e.g. chalk, powdered lime, precipitated silica, pyrogenic silica, zeolites, bentonites, ground minerals, calcium carbonate, quartz dust, precipitated silicon dioxide, silicic anhydride, silicon hydrate or carbon black, magnesium carbonate, clay, baked clay, talc, titanium dioxide, iron oxide, zinc oxide, wood pulp, sawdust, mica, chaff, graphite, fine aluminum powder or flintstone powder, glass beads, glass powder, glass fibers and glass fiber rovings as well as additional inorganic fillers with which those skilled in the art are familiar as well as organic fillers in particular fiber rovings or hollow plastic beads as well as functional fillers which have a positive influence on the rheological properties, e.g. highly dispersed silicic acid in particular with a low BET surface area of 20-150 $m^2/g$, preferably 30-100 $m^2/g$, in particular preferably approximately 50 $m^2/g$. It is especially advantageous if the pyrogenic and/or precipitated silicas have a BET surface area of 10 to 90 $m^2/g$. In their use, they do not cause any additional increase in the viscosity of the inventive preparation but they contribute toward a reinforcement of the hardened preparation.

For many applications, fillers which impart thixotropy to the preparations are preferred. Such fillers are also described as rheological aids, e.g. hydrogenated castor oil, fatty acid amides or swellable plastics such as PVC. To allow them to be expressed well out of the suitable dosing device (e.g. tube), such preparations have a viscosity of 3000 to 15,000, preferably 40,000 to 80,000 mPas or 50,000 to 60,000 mPas.

Furthermore, hollow beads with a mineral shell or a plastic shell are suitable as fillers. These may be hollow glass beads, for example, which are available commercially under the brand names Glass Bubbles®. Hollow beads based on plastic, e.g. Expancel® or Dualite® are made up of organic or inorganic substances, each having a diameter of 1 mm or less, preferably 500 μm or less.

The fillers are preferably used in an amount of 1 to 80 wt %, based on the total weight of the preparation.

The inventive preparation may contain up to approximately 2 wt %, preferably approximately 1 wt % UV stabilizers. Especially suitable UV stabilizers are the so-called hindered amine light stabilizers (HALS). It is preferable within the scope of the present invention to use a UV stabilizer which has a silane group and is incorporated into the end product in crosslinking and/or curing.

Especially suitable here are the product Lowilite 75, Lowilite 77 (Great Lakes, USA).

The inventive preparation may, for example, contain additives which allow a modification of the adhesive properties. Suitable for this purpose are, for example, the so-called tackifier resins which can be subdivided into natural resins and synthetic resins. Suitable tackifier resins include, for example, alkyd resins, epoxy resins, melamine resins, phenolic resins, urethane resins, hydrocarbon resins and natural resins such as colophony, wood turpentine oil and tall oil. Synthetic hydrocarbon resins include ketone resins, coumarone-indene resins, isocyanate resins and terpene-phenolic resins, for example. Within the scope of the present invention, the use of synthetic resins is preferred.

In addition, the inventive preparations may contain flame retardants, e.g. conventional phosphorus compounds, in particular elemental phosphorus, phosphates or phosphonates, e.g. triethyl phosphate or trichloropropyl phosphate. Such compounds may at the same time have plasticizing and viscosity-regulating properties. Other suitable flame retardants include, for example, diphenylcresyl phosphates, triphenyl phosphates, dimethymethane phosphonate and the like. In addition, chloroparaffins may also be used as flame retardants. Also suitable are halogenated polyester polyols or polyether polyols, e.g. commercially brominated polyether polyol.

Accordingly, another subject matter of the present invention is a preparation containing 5 wt % to 80 wt % of a composition comprising:
  (i) at least one polymer A having an organic basic structure Y and at least one reactive silyl group and
  (ii) at least one polymer B having an organic basic structure Y and at least one reactive silyl group,
0 wt % to 50 wt % of a reactive diluent or a mixture of two or more reactive diluents,
0 wt % to 7 wt % UV stabilizers,
0 wt % to 50 wt % plasticizers,
0 wt % to 80 wt % fillers.

Another subject matter of the present invention is the use of the inventive curable compositions or inventive preparations as adhesives, sealants or coating agents.

The inventive preparations are especially suitable, e.g. as contact adhesive, a single-component adhesive, a 2-component adhesive, a construction adhesive, a sealing compound, in particular a joint sealing compound, and for surface sealing.

The inventive preparations are suitable, for example, as adhesives for plastics, metals, mirror, glass, ceramics, mineral substrates, wood, leather, textiles, paper, cardboard and rubber, whereby the materials may be bonded to themselves or to one another in any combination.

In addition, the inventive preparations are suitable, for example, as sealants for plastics, metals, mirror, glass, ceramic, mineral substrates, wood, leather, textiles, paper, cardboard and rubber, whereby the materials may be bonded to themselves or to one another in any combination.

In addition, the inventive preparations are suitable, for example, as surface coating agents for surfaces of plastics, metal, mirror, glass, ceramic, mineral materials, wood, leather, textiles, paper, cardboard and rubber.

With all the aforementioned applications, the inventive preparations may be used as single component systems, i.e., systems curing with atmospheric humidity, or as two-component systems in which the second component contains water.

Therefore, another subject matter of the present invention is adhesives, sealants or coating compounds containing the inventive curable compositions.

The inventive curable compositions usually cure in the presence of moisture.

The following examples serve to illustrate the invention in greater detail.

EXAMPLES

Comparative Example 1

3282 g (281 mmol) polypropylene glycol 12,000 (OH number=9.6) is dried in vacuo in a 5000 mL reactor at 80° C. Under a nitrogen atmosphere at 80° C., 0.7 g dibutyltin laurate is added and then mixed with 142 g (674 mmol) isocyanatopropyl trimethoxysilane (% NCO=19.9). After stirring for 1 hour at 80° C., the resulting polymer is cooled and mixed with 71.0 g vinyltrimethoxysilane and 53.3 g of a mixture of 70 wt % bis(1,2,2,6,6-pentamethyl-4-piperidyl) sebacate and 30 wt % methyl-1,2,2,6,6-penta-methyl-4-piperidyl sebacate (Tinuvin 765). The product is stored moisture-tight in a glass container under a nitrogen atmosphere before being processed further to a curable composition according to the general procedure (Example 11).

Comparative Example 2

326 g (28 mmol) polypropylene glycol 12,000 (OH number=9.7) is dried in vacuo in a 500 mL three-necked flask at 80° C. Under a nitrogen atmosphere at 80° C., 0.07 g dibutyltin laurate is added and then mixed with 11.4 g (68 mmol) isocyanatomethyldimethoxysilane (% NCO=24.9). After stirring for 1 hour at 80° C., the resulting polymer is cooled and mixed with 7.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate (Tinuvin 765). The product is stored moisture-tight in a glass container under a nitrogen atmosphere before being processed further to a curable composition according to the general procedure (Example 11).

Comparative Example 3

325 g (29 mmol) polypropylene glycol 12,000 (OH number=10.1) is dried in vacuo in a 500 mL three-necked flask at 80° C. Under a nitrogen atmosphere at 80° C., 0.07 g dibutyltin laurate is added and then mixed with 12.5 g (59 mmol) isocyanatopropyl trimethoxysilane (% NCO=19.6). After stirring for 1 hour at 80° C., the resulting polymer is cooled and mixed with 7.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate (Tinuvin 765). The product is stored moisture-tight in a glass container under a nitrogen atmosphere before being processed further to yield a curable composition according to the general procedure (Example 11).

Comparative Example 4

140 g (12 mmol) polypropylene glycol 12,000 (OH number=9.5) is dried in vacuo in a 250 mL three-necked flask at 80° C. Under a nitrogen atmosphere at 80° C., 0.7 g dibutyltin laurate is added and then mixed with 4.1 g (24 mmol) isocyanatomethyldimethoxysilane (% NCO=24.5). After stirring for 1 hour at 80° C., the resulting polymer is cooled and mixed with 3.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate (Tinuvin 765). The product is stored moisture-tight in a glass container under a nitrogen atmosphere before being processed further to a curable composition according to the general procedure (Example 11).

Example 1

140 g (12 mmol) polypropylene glycol 12,000 (hydroxyl number (OHN)=9.5) is dried in vacuo at 80° C. in a 250 mL three-necked flask. Under a nitrogen atmosphere at 80° C., 0.3 g dibutyltin dilaurate is added. To this is added 0.7 g (7 mmol) n-butyl isocyanate (% NCO content=42.0). After stirring for 1 hour, this is mixed with 3.7 g (21 mmol) isocyanatomethyldimethoxy-methylsilane (% NCO=24.5) and stirred for 1 hour more at 80° C. The resulting prepolymer mixture is cooled and mixed with 3.0 g N-trimethoxysilylmethyl-O-methylcarbamate and 5.3 g of a mixture of 70 wt % bis(1,2,2,6,6-pentamethyl-4-piperidyl) sebacate and 30 wt % methyl-1,2,2,6,6-penta-methyl-4-piperidyl sebacate. The product is stored moisture-tight in a glass container under a nitrogen atmosphere before being processed further to a curable composition according to the general procedure (Example 11).

Example 2

3435.0 g (297 mmol) polypropylene glycol 12,000 (OH number=9.7) is dried in vacuo at 80° C. in a 4000 mL three-necked flask. Under a nitrogen atmosphere at 80° C., 7.3 g dibutyltin laurate is added. To this is added 17.8 g (178 mmol) n-butyl isocyanate (% NCO content=42.0). After stirring for 1 hour, this is mixed with 88.2 g (416 mmol) isocyanatopropyltrimethoxysilane (% NCO=19.8) and stirred for 1 hour more at 80° C. The resulting prepolymer mixture is cooled and mixed with 73.4 g vinyltrimethoxysilane and 55.1 g of a mixture of 70 wt % bis(1,2,2,6,6-pentamethyl-4-piperidyl) sebacate and 30 wt % methyl-1,2,2,6,6-pentamethyl-4-piperidyl sebacate. The product is stored moisture-tight in a glass container under a nitrogen atmosphere before being processed further to a curable composition according to the general procedure (Example 11).

Example 3

140 g (12 mmol) polypropylene glycol 12,000 (OH number=9.7) is dried in vacuo at 80° C. in a 250 mL three-necked flask. Under a nitrogen atmosphere at 80° C., 0.3 g dibutyltin laurate is added. To this is added 0.5 g (5 mmol) n-butyl isocyanate (% NCO content=42.0). After stirring for 1 hour, this is mixed with 4.4 g (20 mmol) isocyanatomethyltrimethoxysilane (% NCO=19.0) and stirred for 1 hour more at 80° C.

The resulting prepolymer mixture is cooled and mixed with 3.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate (Tinuvin 765). The product is stored moisture-tight in a glass container under a nitrogen atmosphere before being processed further to a curable composition according to the general procedure (Example 11).

Example 4

325 g (28 mmol) polypropylene glycol 12,000 (OH number=9.7) is dried in vacuo at 80° C. in a 500 mL three-necked flask. Under a nitrogen atmosphere at 80° C., 0.7 g dibutyltin laurate is added. To this is added 2.8 g (28 mmol) n-butyl isocyanate (% NCO content=42.0). After stirring for 1 hour, this is mixed with 8.4 g (39 mmol) isocyanatotrimethoxypropylsilane (% NCO=19.6) and stirred for 1 hour more at 80° C. The resulting prepolymer mixture is cooled and mixed with 7.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate. The product is stored moisture-tight in a glass container under a nitrogen atmosphere before being processed further to a curable composition according to the general procedure (Example 11).

Example 5

324 g (28 mmol) polypropylene glycol 12,000 (OH number=9.7) is dried in vacuo at 80° C. in a 500 mL three-necked flask. Under a nitrogen atmosphere at 80° C., 0.7 g dibutyltin laurate is added. To this is added 1.7 g (17 mmol) n-butyl isocyanate (% NCO content=42.0). After stirring for 1 hour, this is mixed with 10.8 g (51 mmol) isocyanatopropyltrimethoxysilane (% NCO=19.6) and stirred for 1 hour more at 80° C. The resulting prepolymer mixture is cooled and mixed with 7.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate. The product is stored moisture-tight in a glass container under a nitrogen atmosphere before being processed further to a curable composition according to the general procedure (Example 11).

Example 6

140 g (12 mmol) polypropylene glycol 12,000 (OH number=9.5) is dried in vacuo at 80° C. in a 250 mL three-necked flask. Under a nitrogen atmosphere at 80° C., 0.3 g dibutyltin laurate is added. To this is added 0.4 g (5 mmol) n-butyl isocyanate (% NCO content=42.0). After stirring for 1 hour, this is mixed with 3.6 g (21 mmol) isocyanatomethyldimethoxymethylsilane (% NCO=24.5) and stirred for 1 hour more at 80° C. The resulting prepolymer mixture is cooled and mixed with 3.0 g vinyltrimethoxysilane and 2.3 g of a mixture of 70 wt % bis(1,2,2,6,6-penta-methyl-4-piperidyl) sebacate and 30 wt % methyl-1,2,2,6,6-pentamethyl-4-piperidyl sebacate (Tinuvin 765). The product is stored moisture-tight in a glass container under a nitrogen atmosphere before being processed further to a curable composition according to the general procedure (Example 11).

Example 7

327 g (28 mmol) polypropylene glycol 12,000 (OH number=9.7) is dried in vacuo at 80° C. in a 500 mL three-necked flask. Under a nitrogen atmosphere at 80° C., 0.7 g dibutyltin laurate is added. To this is added 2.8 g (28 mmol) n-butyl isocyanate (% NCO content=42.0). After stirring for 1 hour, this is mixed with 6.8 g (40 mmol) isocyanatomethyldimethoxymethylsilane (% NCO=24.6) and stirred for 1 hour more at 80° C. The resulting prepolymer mixture is cooled and mixed with 7.0 g vinyltrimethoxysilane and 5.3 g of a mixture of 70 wt % bis(1,2,2,6,6-penta-methyl-4-piperidyl) sebacate and 30 wt % methyl-1,2,2,6,6-pentamethyl- 4-piperidyl sebacate (Tinuvin 765). The product is stored moisture-tight in a glass container under a nitrogen atmosphere before being processed further to a curable composition according to the general procedure (Example 11).

Example 8

327 g (28 mmol) polypropylene glycol 12,000 (OH number=9.7) is dried in vacuo at 80° C. in a 500 mL three-necked flask. Under a nitrogen atmosphere at 80° C., 0.07 g dibutyltin laurate is added. To this is added 2.0 g (17 mmol) phenyl isocyanate (% NCO content=35.0). After stirring for 1 hour, this is mixed with 8.5 g (40 mmol) isocyanatopropyltrimethoxysilane (% NCO=19.6) and stirred for 1 hour more at 80° C. The resulting prepolymer mixture is cooled and mixed with 7.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate (Tinuvin 765). The product is stored moisture-tight in a glass container under a nitrogen atmosphere before being processed further to a curable composition according to the general procedure (Example 11).

Example 9

324 g (28 mmol) polypropylene glycol 12,000 (OH number=10.1) is dried in vacuo at 80° C. in a 500 mL three-necked flask. Under a nitrogen atmosphere at 80° C., 0.07 g dibutyltin laurate is added. To this is added 2.1 g (18 mmol) phenyl isocyanate (% NCO content=35.0). After stirring for 1 hour, this is mixed with 11.3 g (53 mmol) isocyanatopropyltrimethoxysilane (% NCO=19.6) and stirred for 1 hour more at 80° C. The resulting prepolymer mixture is cooled and mixed with 7.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate (Tinuvin 765). The product is stored moisture-tight in a glass container under a nitrogen atmosphere before being processed further to a curable composition according to the general procedure (Example 11).

Example 10

325 g (29 mmol) polypropylene glycol 12,000 (OH number=10.1) is dried in vacuo at 80° C. in a 500 mL three-necked flask. Under a nitrogen atmosphere at 80° C., 0.07 g dibutyltin laurate is added. To this is added 2.8 g (23 mmol) phenyl isocyanate (% NCO content=35.0). After stirring for 1 hour, this is mixed with 10.0 g (47 mmol) isocyanatopropyltrimethoxysilane (% NCO=19.6) and stirred for 1 hour more at 80° C. The resulting prepolymer mixture is cooled and mixed with 7.0 g vinyltrimethoxysilane and 5.3 g of a mixture of 70 wt % bis(1,2,2,6,6-pentamethyl-4-piperidyl) sebacate and 30 wt % methyl-1,2,2,6,6-pentamethyl-4-piperidyl sebacate. The product is stored moisture-tight in a glass container under a nitrogen atmosphere before being processed further to a curable composition according to the general procedure (Example 11).

Example 11

General Procedure for Synthesis of the Inventive Curable Compositions 25 parts by weight of the polymer mixture prepared in the examples was mixed thoroughly for 30 seconds with 20 parts by weight diisoundecyl phthalate in a stirred vessel using a speed mixer. Then to the resulting mixture the following were added in succession: 45 parts by weight precipitated calcium carbonate (50% each Socal U1S2 and Omya BLP3), 3.35 parts by weight stabilized titanium dioxide of the rutile type (Kronos 2056), 1.5 parts vinyltrimethoxysilane (Wacker Geniosil XL10), 0.95 parts by weight 3-amino-propyltrimethoxysilane (Wacker Geniosil GF96) and 0.05 parts by weight dibutyltin dilaurate, and the resulting mixture was mixed thoroughly for 30 seconds in a speed mixer.

Example 12

Test Conditions

The polymers produced were each mixed with 1% N-aminoethyl-3-aminopropyltrimethoxysilane and 0.2% dibutyltin dilaurate. Of these mixtures, the skin-over time (SOT) and the time to development of a tack-free layer (tack-free time, TFT) were determined. In addition, the aforementioned mixtures were applied in a layer thickness of 2 mm to sheets of glass covered with polyether film. After 7 days of storage (23° C., 50% relative atmospheric humidity) test samples (S2 bones) were punched out of these films and the mechanical data (modulus values, elongation, resilience) were determined in accordance with DIN EN 27389 and DIN EN 28339.

TABLE 1

Properties of the inventive example and the Comparative Examples, results after 7 days.

| | Comparative Example | | | | Example | | | | | | | | | |
|---|---|---|---|---|---|---|---|---|---|---|---|---|---|---|
| | 1 | 2 | 3 | 4 | 1 | 2 | 3 | 4 | 5 | 6 | 7 | 8 | 9 | 10 |
| SOT (min) | 23 | 10 | 42.5 | 3.25 | 5.0 | 20 | 22.32 | 60 | 20 | 4.3 | 5.35 | 50 | 33 | 30 |
| TFT (h) | 24 | 24 | 24 | 24 | 24 | 24 | 4 | 24 | 24 | 24 | 24 | 24 | 24 | 24 |
| Breakage (N/mm$^2$) | 0.76 | 0.75 | 0.67 | 0.92 | 0.80 | 0.57 | 0.57 | 0.26 | 0.43 | 0.77 | 0.11 | 0.44 | 0.59 | 0.49 |
| Elongation (%) | 137 | 164 | 120 | 298 | 489 | 218 | 153 | 129 | 123 | 485 | 273 | 168 | 148 | 136 |
| E modulus (N/mm$^2$) | 0.63 | 0.62 | 0.61 | 0.55 | 0.32 | 0.32 | 0.44 | 0.25 | 0.38 | 0.29 | 0.06 | 0.33 | 0.46 | 0.40 |
| Restoring force (%) | 90 | 0 | 95 | 0 | 0% | 85 | 80 | 90 | 90 | 0 | 0 | 90 | 80 | 90 |

The invention claimed is:

1. A curable composition comprising
   (i) at least one polymer A having an organic basic structure Y and at least one reactive silyl group; and
   (ii) at least one polymer B having an organic basic structure Y and at least one reactive silyl group;
wherein the number of reactive silyl groups in (i) is greater than or equal to the number of silyl groups in (ii) and the reactive silyl groups can crosslink to form siloxane bonds and the organic basic structure (Y) of at least one of polymer A or polymer B has a polydispersity PD ($M_w/M_n$) of less than 4.8; wherein polymer A is a compound of general formula (I)

$$(X_3)(X_2)(X_1)Si\text{-}T\text{-}Z\text{---}[Y]\text{-}Z'\text{-}T'\text{-}Si(X_1')(X_2')(X_3') \tag{I}$$

in which $X_1$, $X_2$, $X_3$, $X_1'$, $X_2'$, $X_3'$ independently of one another denote a halogen atom, an amino group, a mercapto group or an alkenyloxy group, an alkyl residue with 1 to 40 carbon atoms or an OR' residue, wherein R' is an alkyl residue with 1 to 40 carbon atoms or an acyl residue with 1 to 40 carbon atoms;

T and T' independently of one another are a linear or branched, substituted or unsubstituted alkylene residues with 1 to 20 carbon atoms;

Z and Z' independently of one another are a carbamate, carboxy, carbonate or sulfonate group or an oxygen atom;

[Y] is the organic basic structure; and wherein the organic basic structure (Y) of at least one of polymer A or polymer B has one or more silyl groups not capable of forming siloxane bonds.

2. A curable composition obtained by reaction of an isocyanate-reactive compound with a first isocyanate-containing silane compound and with a second isocyanate-containing compound, the composition comprising at least two polymeric compounds, polymer A and polymer B, each having at least one reactive silyl group.

3. The curable composition according to claim 2, wherein the ratio of isocyanate-reactive compound to isocyanate-containing compounds is from 1.5:1 to 1:1.5.

4. The curable composition according to claim 2, wherein polymer B is a compound of general formula (II)

$$(X_3)(X_2)(X_1)Si\text{-}T\text{-}Z\text{---}[Y]\text{-}G\text{-}R^2 \tag{II}$$

wherein $X_1$, $X_2$, $X_3$ independently of one another may denote a halogen atom, an amino group, a mercapto group or an alkenyloxy group, an alkyl residue with 1 to 40 carbon atoms or an $OR^1$ residue, where $R^1$ is an alkyl residue with 1 to 40 carbon atoms or an acyl residue with 1 to 40 carbon atoms;

T is a linear or branched, substituted or unsubstituted alkylene residue with 1 to 20 carbon atoms;

Z is a carbamate group;

[Y] is an organic basic structure;

G is a carbamate group or a group -E-D-E'-, wherein E is a carbamate, carboxy, carbonate or sulfonate group or an oxygen atom, E' is a carbamate, carboxy, carbonate, sulfonate or urea group or an oxygen atom, D is a linear or branched, substituted or unsubstituted alkylene, acylene or arylene residue with 1 to 40 carbon atoms; and $R^2$ is a linear or branched, substituted or unsubstituted alkyl, acyl or aryl residue with 1 to 40 carbon atoms or a silyl group, which is not capable of forming siloxane bonds.

5. The curable composition according to claim 4, wherein polymer A is a compound of general formula (I)

$$(X_3)(X_2)(X_1)Si\text{-}T\text{-}Z\text{---}[Y]\text{-}Z'\text{-}T'\text{-}Si(X_1')(X_2')(X_3') \tag{I}$$

in which $X_1$, $X_2$, $X_3$, $X_1'$, $X_2'$, $X_3'$ independently of one another denote a halogen atom, an amino group, a mercapto group or an alkenyloxy group, an alkyl residue with 1 to 40 carbon atoms or an $OR^1$ residue, where $R^1$ is an alkyl residue with 1 to 40 carbon atoms or an acyl residue with 1 to 40 carbon atoms;

T and T' independently of one another are a linear or branched, substituted or unsubstituted alkylene residues with 1 to 20 carbon atoms;

Z and Z' are a carbamate group; and

[Y] is an organic basic structure.

6. The curable composition according to claim 5, wherein polymer A contains on the average at least 1.8 reactive silyl groups per molecule.

7. The curable composition according to claim 5, wherein polymer B contains an average of 1.2 to 1.8 reactive silyl groups per molecule.

8. An adhesive, sealing or coating composition containing the curable composition according to claim 5.

9. A composition containing a curable composition according to claim 2.

10. An adhesive, sealing or coating material, including:
    a curable composition comprising polymer A of general formula (I)

$$(X_3)(X_2)(X_1)Si\text{-}T\text{-}Z\text{---}[Y]\text{-}Z'\text{-}T'\text{-}Si(X_1')(X_2')(X_3') \tag{I}$$

in which $X_1$, $X_2$, $X_3$, $X_1'$, $X_2'$, $X_3'$ independently of one another denote a halogen atom, an amino group, a mercapto group or an alkenyloxy group, an alkyl residue with 1 to 40 carbon atoms or an $OR^1$ residue, wherein $R^1$ is an alkyl residue with 1 to 40 carbon atoms or an acyl residue with 1 to 40 carbon atoms, at least one of $(X_3)$, $(X_2)$, $(X_1)$, $(X_1')$, $(X_2')$, $(X_3')$ being a hydrolyzable residue so that at least one of the $(X_3)(X_2)(X_1)Si$ or $(X_1')(X_2')(X_3')Si$ units comprises a reactive silyl group, T and T' independently of one another are a linear or branched, substituted or unsubstituted alkylene residues with 1 to 20 carbon atoms, Z and Z' independently of one another are a carbamate, carboxy, carbonate or sulfonate group or an oxygen atom, and

[Y] is the organic basic structure; and polymer B of general formula (II)

$$(X_3)(X_2)(X_1)Si\text{-}T\text{-}Z\text{---}[Y]\text{-}G\text{-}R^2 \tag{II}$$

wherein $X_1$, $X_2$, $X_3$ independently of one another may denote a halogen atom, an amino group, a mercapto group or an alkenyloxy group, an alkyl residue with 1 to 40 carbon atoms or an $OR^1$ residue, where $R^1$ is an alkyl residue with 1 to 40 carbon atoms or an acyl residue with 1 to 40 carbon atoms, at least one of $(X_3)$, $(X_2)$, $(X_1)$ being a hydrolyzable residue so that the $(X_3)(X_2)(X_1)Si$ unit comprises a reactive silyl group, T is a linear or branched, substituted or unsubstituted alkylene residue with 1 to 20 carbon atoms, Z is a carbamate, carboxy, carbonate or sulfonate group or an oxygen atom,

[Y] is the organic basic structure,

G is a carbamate, carboxy, carbonate or sulfonate group or an oxygen atom or a group -E-D-E'-, where E is a carbamate, carboxy, carbonate or sulfonate group or an oxygen atom, E' is a carbamate, carboxy, carbonate, sulfonate or urea group or an oxygen atom, D is a linear or branched, substituted or unsubstituted alkylene, acylene or arylene residue with 1 to 40 carbon atoms, and R² is a linear or branched, substituted or unsubstituted alkyl, acyl or aryl residue with 1 to 40 carbon atoms or a silyl group, which is not capable of forming siloxane bonds;

wherein the number of reactive silyl groups in polymer A is greater than or equal to the number of silyl groups in polymer B and the reactive silyl groups can crosslink to form siloxane bonds.

11. A material according to claim 10, wherein the organic basic structures (Y) for polymer A and polymer B have a polydispersity PD ($M_w/M_n$) of less than 4.8.

12. A material according to claim 10, comprising:
5 wt % to 80 wt % of the curable composition,
    optionally up to 50 wt % of reactive diluent,
    optionally up to 7 wt % UV stabilizer,
    optionally up to 50 wt % plasticizer,
    optionally up to 80% filler.

13. A material according to claim 10, wherein Z and Z' in formula (I), in formula (II), or both in formula (I) and in formula (II) is a carbamate group.

14. A material according to claim 10, wherein polymer A contains an average of more than 1.2 reactive silyl groups per molecule and polymer B contains an average of 1.2 to 1.8 reactive silyl groups per molecule.

15. A material according to claim 10, wherein polymer A and polymer B are present in a ratio of 1 polymer A:0.01 polymer B to 1 polymer A:5 polymer B by weight of curable composition.

* * * * *